United States Patent
Takemura et al.

(10) Patent No.: US 8,084,516 B2
(45) Date of Patent: Dec. 27, 2011

(54) WATER-BASED INKS FOR INK-JET PRINTING

(75) Inventors: Kazunari Takemura, Wakayama (JP); Takehiro Tsutsumi, Wakayama (JP); Koji Azuma, Wakayama (JP)

(73) Assignee: Kao Corporation, Tokyo (JP)

( * ) Notice: Subject to any disclaimer, the term of this patent is extended or adjusted under 35 U.S.C. 154(b) by 509 days.

(21) Appl. No.: 12/226,688

(22) PCT Filed: Apr. 26, 2007

(86) PCT No.: PCT/JP2007/059537
§ 371 (c)(1),
(2), (4) Date: Nov. 21, 2008

(87) PCT Pub. No.: WO2007/126145
PCT Pub. Date: Nov. 8, 2007

(65) Prior Publication Data
US 2009/0220693 A1    Sep. 3, 2009

(30) Foreign Application Priority Data

Apr. 28, 2006 (JP) ................................. 2006-125822

(51) Int. Cl.
| | |
|---|---|
| A61L 15/62 | (2006.01) |
| B32B 5/16 | (2006.01) |
| B32B 9/00 | (2006.01) |
| B32B 19/00 | (2006.01) |
| B32B 21/02 | (2006.01) |
| B41J 2/01 | (2006.01) |
| B41J 2/17 | (2006.01) |
| C04B 35/634 | (2006.01) |
| C08C 67/08 | (2006.01) |
| C08J 3/00 | (2006.01) |
| C08K 5/00 | (2006.01) |
| C08K 5/09 | (2006.01) |
| C08K 5/10 | (2006.01) |
| C08K 5/11 | (2006.01) |
| C08K 9/00 | (2006.01) |
| C08L 31/00 | (2006.01) |
| C08L 33/00 | (2006.01) |
| C08L 33/06 | (2006.01) |
| C08L 91/00 | (2006.01) |
| C09B 67/00 | (2006.01) |
| C09D 5/00 | (2006.01) |
| C09D 5/02 | (2006.01) |
| C09D 11/00 | (2006.01) |
| G01D 11/00 | (2006.01) |
| H01B 3/30 | (2006.01) |

(52) U.S. Cl. .............. 523/160; 347/1; 347/95; 347/100; 428/357; 428/402; 428/402.24; 428/407; 523/161; 523/200; 523/205; 523/206; 524/306; 524/308; 524/310; 524/314

(58) Field of Classification Search .................. 523/160, 523/161, 200, 205, 206; 347/1, 95, 100; 428/357, 402, 402.24, 407; 524/306, 308, 524/310, 314, 556, 560, 561
See application file for complete search history.

(56) References Cited

U.S. PATENT DOCUMENTS
2003/0029355 A1* 2/2003 Miyabayashi ............. 106/31.27
2004/0176498 A1    9/2004 Ando et al.

FOREIGN PATENT DOCUMENTS
EP    0 673 969 A1    9/1995
EP    1 059 341 A1    12/2000

OTHER PUBLICATIONS

English translation of Chinese Office Action issued on Dec. 31, 2010 in corresponding Chinese Patent Application No. 200780013545.4.

* cited by examiner

*Primary Examiner* — Patrick Niland
(74) *Attorney, Agent, or Firm* — Birch, Stewart, Kolasch & Birch, LLP

(57) ABSTRACT

The present invention relates to (A) a water dispersion for ink-jet printing including particles of a waster-insoluble crosslinked polymer which contain a colorant, and a water-insoluble organic compound, wherein the water-insoluble crosslinked polymer is (1) a polymer produced by crosslinking a water-insoluble polymer with a crosslinking agent; (2) a polymer produced by crosslinking 100 parts by weight of the water-insoluble polymer with 0.5 to 9.5 parts by weight of the crosslinking agent; or (3) a polymer having a weight-average segment molecular weight of from 1,400 to 20,000 as calculated from [(weigh-average molecular weight of the water-insoluble polymer)/(number of molar equivalents of the crosslinking agent to be reacted with 1 mol of the water-insoluble polymer+1)]; (B) an ink for ink-jet printing containing the above water dispersion which is excellent in gloss and storage stability; and (C) particles of the water-insoluble crosslinked polymer.

8 Claims, No Drawings

WATER-BASED INKS FOR INK-JET PRINTING

FIELD OF THE INVENTION

The present invention relates to water-based inks for ink-jet printing, water dispersions used in the water-based inks, and particles of a water-insoluble crosslinked polymer.

BACKGROUND OF THE INVENTION

In ink-jet printing methods, droplets of ink are directly projected onto a recording medium from very fine nozzles and allowed to adhere to the recording medium to form characters and images. The ink-jet printing methods have been rapidly spread because of their various advantages such as easiness of full coloration, low costs, capability of using ordinary paper (plain paper, recycled paper) as the recording medium, non-contact with printed images and characters, etc.

Among such printing methods, in view of enhancing the weather resistance and water resistance of printed images and characters, an ink-jet printing method utilizing an ink containing a pigment as the colorant has now come to dominate.

WO 00/39226 discloses a water-based ink containing a pigment-containing vinyl polymer.

JP 8-157761A discloses a water-based ink containing an oil film-forming component which is prepared by dissolving a water-insoluble resin therein in order to suppress color bleeding. However, since the water-insoluble resin must be dissolved in the ink, a content of the water-insoluble resin in the ink is small, so that the resultant ink fails to exhibit a sufficient function.

JP 2003-183554A discloses an ink containing 10 to 1000 ppm of a phthalic diester and a latex in order to form images having a good gloss. However, since a content of the phthalic diester in the ink is small, the resultant ink fails to exhibit a sufficient function.

WO 99/52966 discloses a water-based pigment-containing dispersion composed of a carboxyl group-containing thermoplastic resin and a pigment dispersed therein, which is produced by crosslinking the carboxyl group-containing thermoplastic resin after dispersing the pigment therein. In WO 99/52966, it has been described that the thus produced water-based pigment-containing dispersion is excellent in light resistance, water resistance, solvent resistance, stability with time, etc.

JP 9-104834 discloses a process for producing a water-based pigment-containing dispersion by using a pigment and a resin containing a carboxyl group and a crosslinkable functional group, and reacting the crosslinkable functional group of the resin with a crosslinking agent for crosslinking the resin. In JP 9-104834, it has been described that the thus produced water-based pigment-containing dispersion has a good storage stability and is capable of forming a coating film having excellent water resistance and durability, etc.

However, the water-based inks containing the above pigment-containing dispersions have failed to satisfy a good gloss and a good storage stability.

SUMMARY OF THE INVENTION

The present invention relates to the following aspects (1) to (5):

(1) Particles of a water-insoluble crosslinked polymer for ink-jet printing which contain a colorant, wherein the water-insoluble crosslinked polymer is produced by crosslinking 100 parts by weight of a water-insoluble polymer with 0.5 to 9.5 parts by weight of a crosslinking agent.

(2) Particles of a water-insoluble crosslinked polymer for ink-jet printing which contain a colorant, wherein the water-insoluble crosslinked polymer is produced by crosslinking a water-insoluble polymer with a crosslinking agent, and has a weight-average segment molecular weight of 1,400 to 20,000 as calculated from the following formula (1):

Weight-average segment molecular weight=[(weight-average molecular weight of the water-insoluble polymer)/(number of molar equivalents of the crosslinking agent to be reacted with 1 mol of the water-insoluble polymer+1)]   (1), with the proviso that when a ratio of [(number of molar equivalents of the crosslinking agent to be reacted with 1 mol of the water-insoluble polymer)/(number of moles of reactive groups capable of reacting with the crosslinking agent which are contained in the water-insoluble polymer)] is more than 1 (>1), the number of molar equivalents of the crosslinking agent to be reacted with 1 mol of the water-insoluble polymer is identical to the number of moles of reactive groups capable of reacting with the crosslinking agent which are contained in 1 mol of the water-insoluble polymer.

(3) A water dispersion for ink-jet printing including particles of a water-insoluble crosslinked polymer which contain a colorant, and a water-insoluble organic compound, wherein the water-insoluble crosslinked polymer is produced by crosslinking a water-insoluble polymer with a crosslinking agent.

(4) A water-based ink for ink-jet printing including the water dispersion as defined in the above aspect (3).

(5) A use of a water dispersion including particles of a water-insoluble crosslinked polymer which contain a colorant, and a water-insoluble organic compound, for ink-jet printing, wherein the water-insoluble crosslinked polymer is produced by crosslinking a water-insoluble polymer with a crosslinking agent.

DETAILED DESCRIPTION OF THE INVENTION

The present invention relates to a water-based ink which is excellent in gloss and storage stability, a water dispersion for ink-jet printing used in the water-based ink, and particles of a water-insoluble crosslinked polymer.

The present invention includes the following first to third preferred embodiments.

In accordance with the present invention, there are provided a water dispersion for ink-jet printing and particles of a water-insoluble crosslinked polymer, which are capable of producing such a water-based ink having excellent gloss and storage stability by using the water dispersion composed of the particles of the water-insoluble crosslinked polymer which contain a colorant wherein the water-insoluble crosslinked polymer is produced by crosslinking a water-insoluble polymer with a crosslinking agent, and a water-insoluble organic compound.

In the first preferred embodiment of the present invention, there are provided particles of a water-insoluble crosslinked polymer for ink-jet printing which contain a colorant, wherein the water-insoluble crosslinked polymer is produced by crosslinking 100 parts by weight of a water-insoluble polymer with 0.5 to 9.5 parts by weight of a crosslinking agent (claim 1).

In the second preferred embodiment of the present invention, there are provided particles of a water-insoluble crosslinked polymer for ink-jet printing which contain a colorant, wherein the water-insoluble crosslinked polymer is produced by crosslinking a water-insoluble polymer with a crosslinking agent, and has a weight-average segment molecular weight of 1,400 to 20,000 as calculated from the following formula (1):

Weight-average segment molecular weight=[(weight-average molecular weight of the water-insoluble polymer)/(number of molar equivalents of the crosslinking agent to be reacted with 1 mol of the water-insoluble polymer+1)] (1), with the proviso that when a ratio of [(number of molar equivalents of the crosslinking agent to be reacted with 1 mol of the water-insoluble polymer)/(number of moles of reactive groups capable of reacting with the crosslinking agent which are contained in 1 mol of the water-insoluble polymer)] is more than 1 (>1), the number of molar equivalents of the crosslinking agent to be reacted with 1 mol of the water-insoluble polymer is equal to the number of moles of reactive groups capable of reacting with the crosslinking agent which are contained in 1 mol of the water-insoluble polymer (claim 2).

In the third preferred embodiment of the present invention, there is provided a water dispersion for ink-jet printing including particles of a water-insoluble crosslinked polymer which contain a colorant, and a water-insoluble organic compound, wherein the water-insoluble crosslinked polymer is produced by crosslinking a water-insoluble polymer with a crosslinking agent (claim 8).

The constitutional components commonly used in the first to third preferred embodiments of the present invention are explained below. Meanwhile, in the following descriptions, the particles of the water-insoluble crosslinked polymer which contain a colorant are occasionally referred to merely as "crosslinked polymer particles"; the water-insoluble crosslinked polymer is occasionally referred to merely as a "crosslinked polymer"; and the water-insoluble polymer is occasionally referred to merely as a "polymer".

(Water-Insoluble Organic Compound)

It is considered that at least a part of the water-insoluble organic compound used in the present invention is incorporated in the crosslinked polymer particles to improve a flexibility of the crosslinked polymer particles. Further, it is considered that the crosslinked polymer particles which are thus improved in flexibility by incorporating at least a part of the water-insoluble organic compound therein, are enhanced in fusibility therebetween when ejected from a nozzle of an ink-jet printer, and uniformly diffused over a recording paper, resulting in a smooth surface of the printed paper and, therefore, production of prints which are enhanced in gloss.

The water-insoluble organic compound preferably has a molecular weight of from 100 to 2,000 and more preferably from 100 to 1,200 in view of enhancing a gloss of the resultant water-based ink.

The solubility of the water-insoluble organic compound in water is preferably 5 g or lower, more preferably 3 g or lower, still more preferably 1 g or lower and further still more preferably 0.5 g or lower per 100 g of water as measured at 20° C.

The water-insoluble organic compound preferably has a Log P value of from 4 to 16, more preferably from 5 to 16 and still more preferably from 6 to 15 in view of not only enhancing a gloss of printed images formed on a coated paper but also improving a storage stability of a water dispersion containing the water-insoluble organic compound.

Here, the "Log P value" means a logarithm of a 1-octanol/water partition coefficient of the water-insoluble organic compound, and is expressed by a numerical value calculated according to fragment approach using SRC's LOGKNOW/KOWWIN Program of KowWin (Syracuso Research Corporation, USA) (The KowWin Program methodology is described in the following journal article: Meylan, W. M. and P. H. Howard, 1995, "Atom/fragment contribution method for estimating octanol-water partition coefficients", J. Parm. Sci., 84, pp. 83-92). The fragment approach is conducted on the basis of a chemical structure of compounds in which the number of atoms and the type of chemical bonds are taken into consideration. The Log P value is in general a numerical value which is used for relative evaluation of hydrophobic property of organic compounds.

The water-insoluble organic compound is preferably in the form of an ester compound, an ether compound or a sulfonamide compound for facilitating inclusion of the water-insoluble organic compound in the crosslinked polymer particles. The water-insoluble organic compound is more preferably an ester or ether compound (f) containing two or more ester or ether bonds in a molecule thereof, and/or an ester or ether compound (g) containing one or more ester or ether bond and at least one functional group selected from the group consisting of a carboxyl group, a sulfonic group, a phosphoric acid residue, a carbonyl group, an epoxy group and a hydroxyl group in a molecule thereof. The number of the ester or ether bonds in the compound (f) is preferably from 2 to 3; the number of the ester or ether bonds in the compound (g) is preferably from 1 to 3; and the number of the functional groups in the compound (g) is preferably from 1 to 3. Meanwhile, the phosphoric acid residue means a phosphoric group as a remaining part of a phosphoric acid ester or ether which is obtained by excluding the partially esterified or etherified moiety therefrom.

Among these ester compounds, preferred are esters produced from a monovalent carboxylic acid or a salt thereof, and a polyvalent alcohol, and esters produced from a polyvalent acid such as a polycarboxylic acid and phosphoric acid or a salt thereof, and a monovalent alcohol. Among these ether compounds, preferred are ethers of polyvalent alcohols. Examples of the salt include alkali metal salts, alkanol amine salts and ammonium salts.

Examples of the monovalent carboxylic acid include linear or branched aliphatic carboxylic acids having 1 to 18 carbon atoms and preferably 2 to 10 carbon atoms, for example, linear aliphatic carboxylic acids such as acetic acid, butyric acid, caproic acid, caprylic acid, capric acid, lauric acid and palmitic acid, branched aliphatic carboxylic acids such as pivalic acid, and unsaturated aliphatic carboxylic acids such as acrylic acid and methacrylic acid; and aromatic carboxylic acids having 6 to 12 carbon atoms such as, for example, benzoic acid.

Examples of the polyvalent acid include aliphatic carboxylic acids having 2 to 12 carbon atoms such as maleic acid, fumaric acid, itaconic acid, succinic acid, adipic acid and sebacic acid; aromatic carboxylic acids having 6 to 12 carbon atoms such as phthalic acid and trimellitic acid; and phosphoric acids.

Examples of the monovalent alcohol include linear or branched aliphatic alcohols having 1 to 18 carbon atoms and preferably 2 to 10 carbon atoms such as, for example, ethyl alcohol, butyl alcohol, hexyl alcohol, octyl alcohol, decyl alcohol and dodecyl alcohol; aromatic alcohols having 6 to 12 carbon atoms such as, for example, phenol; and alkylene oxide compounds of these alcohols.

Examples of the polyvalent alcohol include those having 2 to 12 carbon atoms such as ethylene glycol, diethylene glycol, neopentyl glycol, trimethylol propane, pentaerythritol and glycerol; and alkylene oxide compounds of these alcohols. The aliphatic acids and alcohols used in the present invention may be either saturated or unsaturated.

Specific examples of the water-insoluble organic compound include (1) aliphatic carboxylic esters, (2) aromatic carboxylic esters, (3) cycloalkane (cycloalkene) carboxylic esters, (4) phosphoric esters, (5) oxyacid esters, (6) glycol esters, (7) epoxy-based esters, (8) sulfonamides, (9) polyesters, (10) glyceryl alkyl ethers, (11) glyceryl alkyl esters and (12) glycol alkyl ethers.

Among these compounds, in view of a good gloss of the resultant ink, preferred are the compounds (1) to (5), (8) and (10); more preferred are one or more compounds selected from the group consisting of (1) aliphatic carboxylic esters, (2) aromatic carboxylic esters, (3) cycloalkane (cycloalkene) carboxylic esters and (4) phosphoric esters; and still more preferred are one or more compounds selected from the group consisting of aliphatic dicarboxylic esters, aromatic di- or tricarboxylic esters, cycloalkane (cycloalkene) dicarboxylic esters and phosphoric di- or tri-esters.

The aliphatic carboxylic esters (1), the aromatic carboxylic esters (2) and the cycloalkane (cycloalkene) carboxylic esters (3) are preferably compounds represented by the following general formula (2):

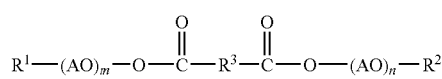
(2)

wherein $R^1$ and $R^2$ are each independently a hydrogen atom or a hydrocarbon group having 1 to 22 carbon atoms, and $R^3$ is a divalent hydrocarbon group having 1 to 18 carbon atoms in which $R^1$ and $R^2$ may be the same or different with the proviso that both of $R^1$ and $R^2$ are not hydrogen atoms at the same time, and $R^1$ to $R^3$ may have a substituent group; m and n are each independently an average molar number of addition of AO of 0 to 30; and AO is an alkanediyloxy group.

$R^1$ and $R^2$ are preferably each independently a linear or branched alkyl or alkenyl group preferably having 2 to 18 carbon atoms and more preferably 4 to 12 carbon atoms, an aralkyl group having 7 to 23 carbon atoms and preferably 7 to 11 carbon atoms, or an aryl group having 6 to 22 carbon atoms and preferably 6 to 10 carbon atoms in view of enhancing a gloss of the resultant prints. Specific examples of the alkyl or alkenyl group, the aralkyl group and the aryl group as $R^1$ and $R^2$ include methyl, ethyl, propyl, isopropyl, butyl, hexyl, 2-ethylhexyl, octyl, dodecyl, cetyl, phenyl and benzyl. The definitions of $R^1$ and $R^2$ are similarly applied to the below-mentioned formulae.

$R^3$ is preferably a divalent aliphatic hydrocarbon group, a divalent cyclic hydrocarbon group or a divalent aromatic hydrocarbon group. Among these groups, more preferred are an alkanediyl group (alkylene group) or an alkenylene group preferably having 2 to 15 carbon atoms, more preferably 2 to 12 carbon atoms and still more preferably 2 to 8 carbon atoms; an arylene group having 6 to 10 carbon atoms, preferably a phenylene group; and a cyclic saturated or unsaturated hydrocarbon group having 3 to 8 carbon atoms. Specific examples of the hydrocarbon groups as $R^3$ include an ethylene group, a trimethylene group, a propane-1,2-diyl group, a tetramethylene group, a heptamethylene group, a hexamethylene group, a pentane-1,5-diyl group, an octamethylene group, a dodecamethylene group and a phenylene group. The definition of $R^3$ is similarly applied to the below-mentioned formulae.

The suffixes m and n are each independently a number of preferably from 0 to 20, more preferably from 0 to 15, still more preferably from 1 to 15, further still more preferably from 2 to 14 and most preferably from 2 to 12.

AO is an alkanediyloxy group (alkyleneoxy group) having 2 to 4 carbon atoms such as an ethyleneoxy (EO) group, a propyleneoxy (PO) group (i.e., a trimethyleneoxy group or a propane-1,2-diyloxy group) and a butyleneoxy (BO) group (i.e., a tetramethyleneoxy group), and when m and n are respectively 2 or more, a plurality of AO groups may be the same or different. When a plurality of AO groups are different from each other, the respective AO groups may be either block-added or random-added.

Examples of the substituent group which may be bonded to $R^1$ to $R^3$ include a halogen atom such as fluorine, chlorine and bromine; an alkoxy group having 1 to 12 carbon atoms such as methoxy, ethoxy and isopropoxy; an aryloxy group such as phenyloxy; an oxycarbonyl group such as methoxycarbonyl; an acyl group such as acetyl and benzoyl; an acyloxy group such as acetyloxy; a cyano group; a nitro group; a hydroxyl group; a carboxyl group; an oxo group; an epoxy group; an ether group and an ester group (these groups are hereinafter referred to totally as a "substituent group"). These substituent groups may be bonded to $R^1$ to $R^3$ alone or in combination of any two or more thereof.

The substituent group which may be bonded to $R^3$ is preferably a group represented by the following general formula:

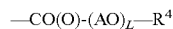

wherein AO has the same meaning as defined above; L has the same meaning as m, and the preferred ranges thereof are also the same as those of m; and $R^4$ has the same meaning as $R^1$, and the preferred examples and ranges thereof are also the same as those of $R^1$. In the case where $R^3$ has the above substituent group, $R^3$ is preferably an aromatic hydrocarbon group.

The aliphatic carboxylic ester (1) is more preferably a compound represented by the above formula (2) wherein $R^3$ is a divalent aliphatic hydrocarbon group which may have a substituent group. Examples of the substituent group which may be bonded to $R^3$ include those exemplified above.

Specific examples of the aliphatic carboxylic ester include aliphatic dibasic acid esters such as dimethyl adipate, diethyl adipate, dibutyl adipate, diisobutyl adipate, bis(2-ethylhexyl) adipate, diisononyl adipate, diisodecyl adipate, bis(butyl diethylene glycol) adipate, dimethyl sebacate, diethyl sebacate, dibutyl sebacate, bis(2-ethylhexyl) sebacate, diethyl succinate and bis(2-ethylhexyl) azelate. Among these esters, especially preferred are diesters of aliphatic dibasic acids having 6 to 14 carbon atoms such as diethyl adipate, dibutyl adipate, diisobutyl adipate, bis(butyl diethylene glycol) adipate, bis(octoxy polyethylene glycol) adipate ($R^1$ and $R^2$ are both 2-ethylhexyl; respective average molar numbers of addition of EO m and n: 1 to 4), bis(octoxy polypropylene glycol) adipate ($R^1$ and $R^2$ are both 2-ethylhexyl; respective average molar numbers of addition of PO m and n: 1 to 6), bis(octoxy polyethylene glycol/polypropylene glycol) adipate ($R^1$ and $R^2$ are both 2-ethylhexyl; respective average molar numbers of addition of sum of EO and PO m and n: 4 to 12; block-added), bis[octoxy poly(ethylene glycol/propylene glycol)] adipate ($R^1$ and $R^2$ are both 2-ethylhexyl; respective average molar numbers of addition of sum of EO and PO m and n: 4 to 12; random-added), diethyl sebacate, dibutyl sebacate and diisobutyl sebacate.

The aromatic carboxylic esters (2) are more preferably compounds represented by the following general formula (3):

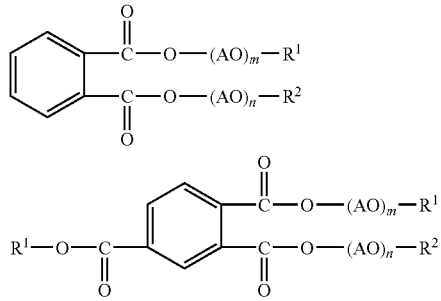
(3)

wherein $R^1$ and $R^2$ respectively have the same meaning as defined above, and $R^1$ and $R^2$ may be the same or different; and AO, m and n respectively have the same meaning as defined above, and when m or n is 2 or more, a plurality of AO groups may be the same or different.

Specific examples of the aromatic carboxylic esters include phthalic esters such as dimethyl phthalate, diethyl phthalate, dibutyl phthalate, diisobutyl phthalate, bis(2-ethylhexyl) phthalate, di-n-octyl phthalate, diisodecyl phthalate, butylbenzyl phthalate, octylbenzyl phthalate, nonylbenzyl phthalate, stearylbenzyl phthalate, octyldecyl phthalate, dicylcohexyl phthalate, diphenyl phthalate, bis(dimethylcyclohexyl) phthalate, bis(t-butylcyclohexyl)phthalate and ethylphthalylethyl glycolate; and trimellitic esters such as tributyl trimellitate, triisobutyl trimellitate and tri(2-ethylhexyl) trimellitate. Among these aromatic carboxylic esters, preferred are phthalic diesters containing an aliphatic alcohol residue having 1 to 5 carbon atoms such as dimethyl phthalate, diethyl phthalate, dibutyl phthalate and diisobutyl phthalate; benzyl phthalates containing an alkyl group having 3 to 18 carbon atoms such as octylbenzyl phthalate, nonylbenzyl phthalate and stearylbenzyl phthalate; phthalic esters such as bis(octoxy polyethylene glycol) phthalate ($R^1$ and $R^2$ are both 2-ethylhexyl; respective average molar numbers of addition of EO m and n: 1 to 5), bis(octoxy polypropylene glycol) phthalate ($R^1$ and $R^2$ are both 2-ethylhexyl; respective average molar numbers of addition of PO m and n: 1 to 4), bis(octoxy polyethylene glycol/polypropylene glycol) phthalate ($R^1$ and $R^2$ are both 2-ethylhexyl; respective average molar numbers of addition of sum of EO and PO m and n: 4 to 12; block-added), bis[octoxy poly(ethylene glycol/propylene glycol)]phthalate ($R^1$ and $R^2$ are both 2-ethylhexyl; respective average molar numbers of addition of sum of EO and PO m and n: 4 to 12; random-added); and trimellitic diesters containing an aliphatic alcohol residue having 3 to 5 carbon atoms such as tributyl trimellitate and triisobutyl trimellitate.

The cycloalkane (cycloalkene) carboxylic esters (3) are more preferably cyclohexane (cyclohexene) carboxylic esters represented by the following general formula (4):

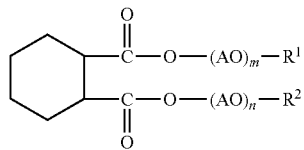
(4)

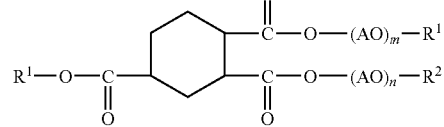

wherein $R^1$ and $R^2$ respectively have the same meanings as defined above, and $R^1$ and $R^2$ may be the same or different; and AO, m and n respectively have the same meanings as defined above, and when m or n is 2 or more, a plurality of AO groups may be the same or different.

Examples of the cycloalkane (cycloalkene) group include cyclic hydrocarbon groups which may contain an unsaturated group having 3 to 8 carbon atoms.

Specific examples of the cycloalkane (cycloalkene) carboxylic esters include cyclohexane carboxylic esters such as dibutyl 1,2-cyclohexanedicarboxylate and diisononyl 1,2-cyclohexanedicarboxylate; and cyclohexene carboxylic esters such as dibutyl 3,4-cyclohexenedicarboxylate and diisononyl 3,4-cyclohexenedicarboxylate.

The phosphoric esters (4) are preferably compounds represented by the following general formula (5):

$$O=P\begin{matrix}O-R^1\\|\\O-R^2\\|\\O-R^1\end{matrix}$$
(5)

wherein $R^1$ and $R^2$ respectively have the same meanings as defined above, and $R^1$ and $R^2$ may be the same or different.

Specific examples of the phosphoric esters include tributyl phosphate, tris(2-ethylhexyl) phosphate, tris(butoxyethyl) phosphate, triphenyl phosphate, tricresyl phosphate, trixylenyl phosphate, cresyldiphenyl phosphate and 2-ethylhexyl diphenyl phosphate. Among these phosphoric esters, preferred are phosphoric esters containing an alkoxyalkyl group having 5 to 9 carbon atoms such as tris(butoxyethyl) phosphate; phosphoric esters containing an aliphatic hydrocarbon group having 4 to 12 carbon atoms such as tributyl phosphate; and phosphoric esters containing an aromatic hydrocarbon group having 7 to 12 carbon atoms such as tris(butoxyethyl) phosphate, tricresyl phosphate, trixylenyl phosphate and cresylphenyl phosphate. The phosphoric esters are preferably in the form of a phosphoric di- or triester.

The oxyacid esters (5) are preferably compounds represented by the following general formula (6):

(6)

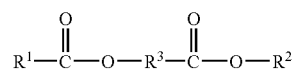

wherein $R^1$, $R^2$ and $R^3$ respectively have the same meanings as defined above, and $R^1$ and $R^2$ may be the same or different.

Specific examples of the oxyacid esters include triethyl acetylcitrate, tributyl acetylcitrate and methyl acetylricinoleate.

The glycol esters (6) are preferably compounds represented by the following general formula (7):

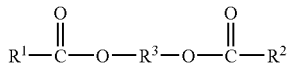

(7)

wherein $R^1$, $R^2$ and $R^3$ respectively have the same meanings as defined above, and $R^1$ and $R^2$ may be the same or different.

Specific examples of the glycol esters include diethylene glycol dibenzoate and triethylene glycol di(2-ethyl hexoate).

The epoxy-based esters (7) are preferably compounds represented by the following general formula (8):

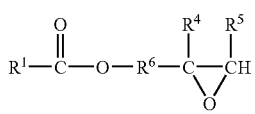

(8)

wherein $R^1$ has the same meaning as defined above, and $R^4$ and $R^5$ are each independently a hydrogen atom or a lower alkyl group having 1 to 5 carbon atoms; and $R^6$ is an alkanediyloxy group having 1 to 6 carbon atoms.

Specific examples of the epoxy-based esters include butyl epoxystearate and octyl epoxystearate.

The sulfonamides (8) are preferably compounds represented by the following general formula (9):

$$R^1-SO_2NH-R^2 \quad (9)$$

wherein $R^1$ and $R^2$ respectively have the same meanings as defined above, and $R^1$ and $R^2$ may be the same or different.

Specific examples of the sulfonamides (8) include o- and p-toluene sulfonamides and N-butylbenzene sulfonamide.

The polyesters (9) are preferably compounds represented by the following general formula (10):

(10)

wherein $R^1$, $R^2$ and $R^3$ respectively have the same meanings as defined above, and $R^1$ and $R^2$ as well as a plurality of $R^3$ groups may be respectively the same or different; p is a number of from 1 to 18 and preferably from 1 to 10.

Specific examples of the polyesters include poly(1,2-butanediol adipate) and poly(1,3-butanediol adipate).

Specific examples of the glyceryl alkyl ethers (10) include glyceryl monoethers, glyceryl diethers and glyceryl triethers. Among these glyceryl alkyl ethers, preferred are glyceryl monoethers containing a linear or branched alkyl group having 8 to 30 carbon atoms. The alkyl group have 8 to 30 carbon atoms, preferably 8 to 22 carbon atoms and more preferably 8 to 14 carbon atoms.

Examples of the alkyl group include 2-ethylhexyl, (iso)octyl, (iso)decyl, (iso)dodecyl, (iso)myristyl, (iso)cetyl, (iso)stearyl and (iso)behenyl.

The bonding position of the alkyl group in the glyceryl alkyl ethers is not particularly limited, and the glyceryl alkyl ethers may be in the form of a 1-alkyl glyceryl monoether or a 2-alkyl glyceryl monoether.

Specific examples of the glyceryl alkyl esters (11) include glyceryl monoalkyl esters, glyceryl dialkyl esters and glyceryl trialkyl esters.

Among these glyceryl alkyl esters, preferred are glyceryl alkyl esters of linear or branched aliphatic carboxylic acids having 1 to 18 carbon atoms and preferably 2 to 10 carbon atoms, for example, linear aliphatic carboxylic acids such as acetic acid, butyric acid, caproic acid, caprylic acid, capric acid, lauric acid and palmitic acid, and branched aliphatic carboxylic acids such as pivalic acid. The total number of carbon atoms in the alkyl groups is preferably 6 or more and more preferably 8 or more.

Further specific examples of the glyceryl alkyl esters (11) include glyceryl triacetate, glyceryl diacetate and glyceryl monoacetate.

Specific examples of the glycol alkyl ethers (12) include glycol monoalkyl ethers and glycol dialkyl ethers.

Examples of the glycol contained in the compounds (12) include ethylene glycol and neopentyl glycol. Examples of the alkyl group contained in the compounds (12) include a linear or branched alkyl group having 1 to 22 carbon atoms. The total number of carbon atoms in the alkyl groups is preferably 6 or more and more preferably 8 or more.

The above water-insoluble organic compounds (1) to (12) may be used alone or in the form of a mixture of any two or more thereof. Among these water-insoluble organic compounds, preferred are those compounds represented by the above general formula (2) in view of a good gloss of the obtained water dispersion and ink.

(Colorant)

The colorant is used to exhibit an effect of enhancing the gloss as aimed by the present invention. The colorant is not particularly limited, and there may be used any of pigment, hydrophobic dye, and water-soluble dye such as acid dye, reactive dye and direct dye. The colorant used in the present invention is preferably pigment or hydrophobic dye in view of a good water resistance, a good dispersion stability and a good rubbing resistance. Among these colorants, to meet the recent strong demand for a high weather resistance, preferred is the pigment. The present invention is especially suitable to enhance gloss and storage stability of the water-based ink using a pigment.

The pigment or hydrophobic dye used in the water-based ink is required to be present in the form of stable fine particles using a surfactant or a polymer. In particular, in view of anti-bleeding property and water resistance, the pigment and/or hydrophobic dye is preferably included in the polymer particles.

The pigment may be either organic or inorganic. The organic or inorganic pigment may be used in combination with an extender pigment, if required.

Examples of the inorganic pigments include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the organic pigments include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of commercially available products marketed under the tradenames C.I. Pigment Yellow, C.I. Pigment Red, C.I.

Pigment Violet, C.I. Pigment Blue and C.I. Pigment Green, etc., with various product numbers.

Examples of the extender pigment include silica, calcium carbonate and talc.

The hydrophobic dyes are not particularly limited as long as they are capable of being included in the crosslinked polymer particles. To allow the dye to efficiently become included in the polymer, the solubility of the hydrophobic dye is preferably 2 g/L or more and more preferably from 20 to 500 g/L as measured at 25° C. on the basis of the organic solvent used upon the production of the polymer, such as preferably methyl ethyl ketone.

Examples of the hydrophobic dyes include oil-soluble dyes and disperse dyes. Among these dyes, preferred are oil-soluble dyes.

Examples of the oil-soluble dyes include one or more dyes selected from the group consisting of commercially available products marketed from Orient Chemical Co., Ltd., BASF AG, etc., under the tradenames C.I. Solvent Black, C.I. Solvent Yellow, C.I. Solvent Red, C.I. Solvent Violet, C.I. Solvent Blue, C.I. Solvent Green, and C.I. Solvent Orange, etc., with various product numbers.

Examples of the disperse dyes include one or more dyes selected from the group consisting of commercially available products marketed under the tradenames C.I. Disperse Yellow, C.I. Disperse Orange, C.I. Disperse Red, C.I. Disperse Violet, C.I. Disperse Blue, C.I. Disperse Green, etc., with various product numbers. Among these dyes, preferred are C.I. Solvent Yellow 29 and 30 for yellow colorant, C.I. Solvent Blue 70 for cyan colorant, C.I. Solvent Red 18 and 49 for magenta colorant, and C.I. Solvent Black 3 and 7 and nigrosine black dyes for black colorant.

Among these colorants, preferred are those colorants having a chromatic color except for white, black and intermediate colors (halftone) between white and black. The above colorants may be used alone or in the form of a mixture containing any two or more thereof at an optional mixing ratio. The weight ratio of the water-insoluble polymer to the colorant (water-insoluble polymer/colorant) is preferably from 10/90 to 90/10, more preferably from 20/80 to 80/20, and still more preferably from 20/80 to 50/50 in view of enhancing the gloss and storage stability.

(Water-Insoluble Polymer)

The water-insoluble polymers used in the present invention can be crosslinked with a crosslinking agent to form crosslinked polymers. Here, the "water-insoluble polymers" mean polymers exhibiting a solubility in water of 10 g or lower, preferably 5 g or lower and more preferably 1 g or lower when the polymers are dried at 105° C. for 2 h, and then dissolved in 100 g of water at 25° C. In the case where the polymers have a salt-forming group, the solubility means a solubility of the polymers whose salt-forming groups are neutralized completely (i.e., 100%) with acetic acid or sodium hydroxide according to kinds of the salt-forming groups.

Examples of the water-insoluble polymers used in the present invention include polyesters, polyurethanes and vinyl polymers. Among these polymers, preferred are vinyl polymers obtained by addition-polymerizing vinyl monomers such as vinyl compounds, vinylidene compounds and vinylene compounds in view of a good dispersion stability thereof.

(Vinyl Polymer)

The vinyl polymer used in the present invention is preferably a water-insoluble vinyl polymer which is produced by copolymerizing a monomer mixture containing (a) a salt-forming group-containing monomer (hereinafter occasionally referred to merely as a "component (a)"), and (b) a macromer (hereinafter occasionally referred to merely as a "component (b)") and/or (c) a hydrophobic monomer (hereinafter occasionally referred to merely as a "component (c)") (such a mixture is hereinafter referred to merely as a "monomer mixture"). The water-insoluble vinyl polymer contains a constitutional unit derived from the component (a), and a constitutional unit derived from the component (b) and/or a constitutional unit derived from the component (c). The water-insoluble vinyl polymer is more preferably a water-insoluble graft polymer containing the constitutional unit derived from the component (a) or the constitutional units derived from the components (a) and (c) as a main chain, and the constitutional unit derived from the component (b) as a side chain.

The salt-forming group-containing monomer (a) is used for enhancing a dispersion stability of the resultant water dispersion. Examples of the salt-forming group include a carboxyl group, a sulfonic group, a phosphoric group, an amino group and an ammonium group.

Examples of the salt-forming group-containing monomers include cationic monomers and anionic monomers as described in paragraph [0022], etc., of JP 9-286939A.

Typical examples of the cationic monomers include unsaturated amine-containing monomers and unsaturated ammonium salt-containing monomers. Among these cationic monomers, preferred are N,N-dimethylaminoethyl(meth)acrylate, N—(N',N'-dimethylaminopropyl) (meth)acrylate and vinyl pyrrolidone.

Typical examples of the anionic monomers include unsaturated carboxylic acid monomers, unsaturated sulfonic acid monomers and unsaturated phosphoric acid monomers.

Examples of the unsaturated carboxylic acid monomers include acrylic acid, methacrylic acid, crotonic acid, itaconic acid, maleic acid, fumaric acid, citraconic acid and 2-methacryloyloxymethylsuccinic acid. Examples of the unsaturated sulfonic acid monomers include styrenesulfonic acid, 2-acrylamido-2-methylpropanesulfonic acid, 3-sulfopropyl (meth)acrylate and bis(3-sulfopropyl)itaconic ester. Examples of the unsaturated phosphoric acid monomers include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability and a good ejecting stability of the resultant inks, preferred are the unsaturated carboxylic acid monomers, and more preferred are acrylic acid and methacrylic acid.

The macromer (b) is used for enhancing a dispersion stability of the crosslinked polymer particles. The macromer (b) is in the form of a monomer containing a polymerizable unsaturated group which has a number-average molecular weight of 500 to 100,000 and preferably 1,000 to 10,000. Meanwhile, the number-average molecular weight of the macromer (b) may be measured by gel chromatography using chloroform containing 1 mmol/L of dodecyl dimethylamine as a solvent and using polystyrene as a standard substance.

Among these macromers (b), in view of a good dispersion stability of the crosslinked polymer particles, etc., preferred are styrene-based macromers and aromatic group-containing (meth)acrylate-based macromers which have a polymerizable functional group at one terminal end thereof.

Examples of the styrene-based macromers include homopolymers of styrene-based monomers, and copolymers of the styrene-based monomers with other monomers.

Examples of the styrene-based monomers include styrene, 2-methyl styrene, vinyl toluene, ethylvinyl benzene, vinyl naphthalene and chlorostyrene.

As the aromatic group-containing (meth)acrylate-based macromers, there are preferably used homopolymers of an aromatic group-containing (meth)acrylate and copolymers of the aromatic group-containing (meth)acrylate with other monomers. Examples of the aromatic group-containing (meth)acrylate include (meth)acrylates containing an arylalkyl group having 7 to 22 carbon atoms, preferably 7 to 18 carbon atoms and more preferably 7 to 12 carbon atoms which may have a substituent group containing a hetero atom, or an aryl group having 6 to 22 carbon atoms, preferably 6 to 18 carbon atoms and more preferably 6 to 12 carbon atoms which may have a substituent group containing a hetero atom. Examples of the substituent group containing a hetero atom include a halogen atom, an ester group, an ether group and a hydroxyl group. Examples of the aromatic group-containing (meth)acrylate include benzyl(meth)acrylate, phenoxyethyl (meth)acrylate, 2-hydroxy-3-phenoxypropyl acrylate and 2-methacryloyloxyethyl-2-hydroxypropyl phthalate. Among these aromatic group-containing (meth)acrylates, preferred is benzyl(meth)acrylate.

The polymerizable functional group bonded to one terminal end of these macromers is preferably an acryloyloxy group or a methacryloyloxy group. Examples of the other monomers copolymerizable with the aromatic group-containing (meth)acrylate include acrylonitrile.

The content of the constitutional unit derived from the styrene-based monomer in the styrene-based macromer or the content of the constitutional unit derived from the aromatic group-containing (meth)acrylate in the aromatic group-containing (meth)acrylate-based macromer is preferably 50% by weight or more and more preferably 70% by weight or more in view of enhancing an affinity to pigments.

The macromer (b) may further contain side chains composed of other constitutional units derived from an organopolysiloxane, etc. Such a side chain may be produced, for example, by copolymerizing with the macromer, a silicone-based macromer having a polymerizable functional group at one terminal end thereof which is represented by the following general formula (11):

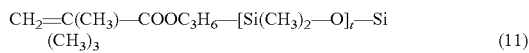

wherein t is a number of from 8 to 40.

The styrene-based macromer as the component (b) is commercially available, for example, from Toagosei Co., Ltd., as product names of AS-6(S), AN-6(S), HS-6(S), etc.

The hydrophobic monomer (c) is used for enhancing an optical density of the resultant ink. Examples of the hydrophobic monomer include alkyl (meth)acrylates and aromatic group-containing monomers.

The preferred alkyl(meth)acrylates are those containing an alkyl group having 1 to 22 carbon atoms and preferably 6 to 18 carbon atoms. Examples of the alkyl(meth)acrylates include methyl(meth)acrylate, ethyl(meth)acrylate, (iso)propyl(meth)acrylate, (iso- or tertiary-)butyl(meth)acrylate, (iso)amyl (meth)acrylate, cyclohexyl(meth)acrylate, 2-ethylhexyl(meth)acrylate, (iso)octyl(meth)acrylate, (iso)decyl (meth)acrylate, (iso)dodecyl(meth)acrylate and (iso)stearyl (meth)acrylate.

Meanwhile, the terms "(iso- or tertiary-)" and "(iso)" used herein mean both the structure in which the groups expressed by "iso" and "tertiary" are present, and the structure in which these groups are not present (i.e., normal). and the "(meth) acrylate" means acrylate, methacrylate or both thereof.

The aromatic group-containing monomer may contain a substituent group having a hetero atom, and is preferably a vinyl monomer containing an aromatic group having 6 to 22 carbon atoms, preferably 6 to 18 carbon atoms and more preferably 6 to 12 carbon atoms. Examples of the aromatic group-containing monomer include the above styrene-based monomer (component c-1), and the above aromatic group-containing (meth)acrylate (component c-2). Examples of the substituent group having a hetero atom include those exemplified previously.

Among these components (c), in view of enhancing an optical density, preferred is the styrene-based monomer (component c-1). Among these styrene-based monomers, especially preferred are styrene and 2-methyl styrene. The content of the component (c-1) in the component (c) is preferably from 10 to 100% by weight and more preferably from 20 to 80% by weight in view of enhancing an optical density.

Also, examples of the preferred aromatic group-containing (meth)acrylate as the component (c-2) include benzyl(meth) acrylate and phenoxyethyl (meth)acrylate. The content of the component (c-2) in the component (c) is preferably from 10 to 100% by weight and more preferably from 20 to 80% by weight in view of enhancing an optical density and a gloss. Further, the components (c-1) and (c-2) are preferably used in combination with each other.

The monomer mixture may further contain (d) a hydroxyl-containing monomer (hereinafter occasionally referred to merely as a "component (d)"). The hydroxyl-containing monomer (d) is used to exhibit an excellent effect of enhancing a dispersion stability of the polymer particles.

Examples of the component (d) include 2-hydroxyethyl (meth)acrylate, 3-hydroxypropyl(meth)acrylate, polyethylene glycol (n=2 to 30 wherein n represents an average molar number of addition of oxyalkylene groups: this definition is similarly applied to the following descriptions) (meth)acrylate, polypropylene glycol (n=2 to 30) (meth)acrylate, and poly(ethylene glycol (n=1 to 15)/propylene glycol (n=1 to 15) (meth)acrylate. Among these hydroxyl-containing monomers, preferred are 2-hydroxyethyl(meth)acrylate, polyethylene glycol mono-methacrylate and polypropylene glycol methacrylate.

The monomer mixture may further contain (e) a monomer (hereinafter occasionally referred to merely as a "component (e)") represented by the following general formula (12):

wherein $R^7$ is a hydrogen atom or a lower alkyl group having 1 to 5 carbon atoms; $R^8$ is a divalent hydrocarbon group having 1 to 30 carbon atoms which may contain a hetero atom; $R^9$ is a monovalent hydrocarbon group having 1 to carbon atoms which may contain a hetero atom or a phenyl group which may contain an alkyl group having 1 to 9 carbon atoms; and q represents an average molar number of addition of $R^8O$ groups, and is a number of from 1 to 60 and preferably a number of from 1 to 30.

The component (e) is used to exhibit an excellent effect of enhancing an ejection property of the resultant ink.

Examples of the hetero atom which may be contained in the monomer of the general formula (12) include a nitrogen atom, an oxygen atom, a halogen atom and a sulfur atom.

Examples of the suitable $R^7$ group include methyl, ethyl and (iso)propyl.

Examples of the suitable $R^8O$ group include oxyethylene, oxytrimethylene, oxypropane-1,2-diyl, oxytetramethylene, oxyheptamethylene, oxyhexamethylene, and an oxyalkanediyl(oxyalkylene) group having 2 to 7 carbon atoms which is constituted from combination of at least two of these groups.

Examples of the suitable $R^9$ group include an aliphatic alkyl group having 1 to 30 carbon atoms, preferably 1 to 20 carbon atoms and more preferably 1 to 8 carbon atoms, an aromatic ring-containing alkyl group having 7 to 30 carbon atoms, a hetero ring-containing alkyl group having 4 to 30 carbon atoms, and a phenyl group which may contain an alkyl group having 1 to 8 carbon atoms.

Specific examples of the component (e) include methoxy polyethylene glycol (q in the general formula (12): 1 to 30; this definition is similarly applied to the following compounds) (meth)acrylate, methoxy polytetramethylene glycol (q=1 to 30) (meth)acrylate, ethoxy polyethylene glycol (q=1 to 30) (meth)acrylate, octoxy polyethylene glycol (q=1 to 30) (meth)acrylate, polyethylene glycol (q=1 to 30) (meth)acrylate 2-ethylhexyl ether, (iso)propoxy polyethylene glycol (q=1 to 30) (meth)acrylate, butoxy polyethylene glycol (q=1 to 30) (meth)acrylate, methoxy polypropylene glycol (q=1 to 30) (meth)acrylate, and methoxy(ethylene glycol/propylene glycol copolymer) (q=1 to 30: among which the number of ethylene glycol constitutional units is 1 to 29) (meth)acrylate. Among these compounds, preferred are octoxy polyethylene glycol (q=1 to 30) (meth)acrylate and polyethylene glycol (q=1 to 30) (meth)acrylate 2-ethylhexyl ether.

Examples of the commercially available components (d) and (e) include polyfunctional acrylate monomers (NK esters) available from Shin-Nakamura Kagaku Kogyo Co., Ltd., such as "M-40G", "M-90G" and "M-230G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300", "50POEP-800B" and "43PAPE-600B".

These components (a) to (e) are respectively used alone or in the form of a mixture of any two or more thereof.

Upon production of the water-insoluble vinyl polymer, the contents of the above components (a) to (e) in the monomer mixture (contents of non-neutralized components; this definition is similarly applied to the following descriptions) or the contents of the constitutional units derived from the components (a) to (e) in the water-insoluble polymer are as follows.

The content of the component (a) is preferably from 2 to 40% by weight, more preferably from 2 to 30% by weight and still more preferably from 3 to 20% by weight in view of a good dispersion stability of the resultant water dispersion.

The content of the component (b) is preferably from 1 to 25% by weight and more preferably from 5 to 20% by weight, in particular, in view of enhancing an interaction with the colorant.

The content of the component (c) is preferably from 5 to 98% by weight and more preferably from 10 to 60% by weight in view of enhancing an optical density.

The content of the component (d) is preferably from 5 to 40% by weight and more preferably from 7 to 20% by weight in view of a good dispersion stability of the resultant water dispersion.

The content of the component (e) is preferably from 5 to 50% by weight and more preferably from 10 to 40% by weight in view of a good ejection property of the resultant ink.

The total content of the components (a) and (d) in the monomer mixture is preferably from 6 to 60% by weight and more preferably from 10 to 50% by weight in view of a good dispersion stability of the resultant water dispersion. The total content of the components (a) and (e) in the monomer mixture is preferably from 6 to 75% by weight and more preferably from 13 to 50% by weight in view of a good dispersion stability of the resultant water dispersion and a good ejection property of the resultant ink. The total content of the components (a), (d) and (e) in the monomer mixture is preferably from 6 to 60% by weight and more preferably from 7 to 50% by weight in view of a good dispersion stability of the resultant water dispersion and a good ejection property of the resultant ink.

Also, the weight ratio of the component (a) to a sum of the components (b) and (c) [component (a)/(component (b)+component (c))] is preferably from 0.01 to 1, more preferably from 0.02 to 0.67 and still more preferably from 0.03 to 0.50 in view of a good dispersion stability and a good optical density of the resultant water dispersion.

(Production of Water-Insoluble Polymer)

The water-insoluble polymer used in the present invention may be produced by copolymerizing the monomer mixture by known methods such as bulk polymerization, solution polymerization, suspension polymerization and emulsion polymerization. Among these polymerization methods, preferred is the solution polymerization.

The solvent used in the solution polymerization method is preferably an organic polar solvent, although not limited thereto. The organic polar solvent miscible with water may be used in the form of a mixture with water. Examples of the organic polar solvents include aliphatic alcohols having from 1 to 3 carbon atoms such as methanol, ethanol and propanol; ketones such as acetone and methyl ethyl ketone; and esters such as ethyl acetate. Among these solvents, preferred are methanol, ethanol, acetone, methyl ethyl ketone and mixed solvents of at least one thereof with water.

The polymerization may be carried out in the presence of a conventionally known radical polymerization initiator, e.g., azo compounds such as 2,2'-azobisisobutyronitrile and 2,2'-azobis(2,4-dimethylvaleronitrile), and organic peroxides such as t-butyl peroxyoctoate and dibenzoyl oxide.

The amount of the radical polymerization initiator to be used in the polymerization is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture vary depending upon the kinds of radical polymerization initiator, monomers, solvent, etc., to be used, and therefore are not particularly limited. The polymerization is generally conducted at a temperature of preferably from 30 to 100° C. and more preferably from 50 to 80° C. for 1 to 20 h. Further, the polymerization is preferably conducted in an atmosphere of an inert gas such as nitrogen and argon.

After completion of the polymerization reaction, the polymer thus produced may be isolated from the reaction solution by a known method such as reprecipitation and removal of solvent by distillation. The thus obtained polymer may be purified by repeated reprecipitation, membrane separation, chromatography, extraction, etc., for removing unreacted monomers, etc., therefrom.

The weight-average molecular weight of the water-insoluble polymer used in the present invention is preferably from 5,000 to 500,000, more preferably from 10,000 to 400,000 and still more preferably from 10,000 to 300,000 in view of a good gloss and a good dispersion stability of the colorant therein. Meanwhile, the weight-average molecular weight of the water-insoluble polymer was measured by the method as described in Examples below.

When the water-insoluble vinyl polymer used in the present invention contains a salt-forming group derived from the salt-forming group-containing monomer (a), the salt-forming group is neutralized with a neutralizing agent. As the neutralizing agent, acids or bases may be used according to the kind of the salt-forming group in the polymer. Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine, triethanolamine and tributylamine.

The degree of neutralization of the salt-forming group is preferably from 10 to 200%, more preferably from 20 to 150% and still more preferably from 50 to 150%.

The degree of neutralization of the anionic salt-forming group is calculated according to the following formula:

[weight (g) of neutralizing agent/equivalent of neutralizing agent]/[acid value of polymer (KOH mg/g)×weight (g) of polymer/(56×1000)]×100

The degree of neutralization of the cationic salt-forming group is calculated according to the following formula:

[weight (g) of neutralizing agent/equivalent of neutralizing agent]/[amine value of polymer (HCl mg/g)×weight (g) of polymer/(36.5×1000)]×100

The acid value or amine value may be calculated from the respective constitutional units of the polymer, or may also be determined by the method of subjecting a solution prepared by dissolving the polymer in an appropriate solvent such as methyl ethyl ketone to titration.

(Crosslinking Agent)

The crosslinking agent used in the present invention is preferably selected from those compounds containing at least two reactive groups in a molecule thereof in order to adequately crosslink the water-insoluble polymer. The molecular weight of the crosslinking agent is preferably from 120 to 2000, more preferably from 150 to 1500 and still more preferably from 150 to 1000 in view of a facilitated reaction of the polymer and a good storage stability of the resultant crosslinked polymer particles.

The number of the reactive groups contained in the crosslinking agent is preferably from 2 to 4 and most preferably 2 in view of a well-controlled molecular weight of the resultant crosslinked polymer and a good gloss of the resultant dispersion and ink. The reactive groups are preferably one or more groups selected from the group consisting of a hydroxyl group, an epoxy group, an aldehyde group, an amino group and a carboxyl group.

Specific examples of the crosslinking agent include:

(a) Compounds containing two or more hydroxyl groups in a molecule thereof:

Example of the compounds containing two or more hydroxyl groups include polyhydric alcohols such as ethylene glycol, diethylene glycol, triethylene glycol, polyethylene glycol, glycerol, polyglycerol, propylene glycol, 1,4-butanediol, 1,5-pentanediol, 1,6-hexanediol, neopentyl alcohol, diethanol amine, tridiethanol amine, polypropylene glycol, polyvinyl alcohol, pentaerythritol, sorbitol, sorbitan, glucose, mannitol, mannitan, sucrose and glucose.

(b) Compounds containing two or more epoxy groups in a molecule thereof:

Examples of the compounds containing two or more epoxy groups include polyglycidyl ethers such as ethylene glycol diglycidyl ether, polyethylene glycol diglycidyl ether, glycerol triglycidyl ether and polyglycerol polyglycidyl ether.

(c) Compounds containing two or more aldehyde groups in a molecule thereof:

Examples of the compounds containing two or more aldehyde groups include polyaldehydes such as glutaraldehyde and glyoxal.

(d) Compounds containing two or more amino groups in a molecule thereof:

Examples of the compounds containing two or more amino groups include polyamines such as ethylenediamine and polyethyleneimine.

(e) Compounds containing two or more carboxyl groups in a molecule thereof:

Examples of the compounds containing two or more carboxyl groups include polycarboxylic acids such as oxalic acid, malonic acid, succinic acid, fumaric acid, maleic acid and adipic acid.

The water-insoluble polymer also contains a reactive group (crosslinkable functional group) capable of reacting with the crosslinking agent. The preferred combinations of the water-insoluble polymer and the crosslinking agent are as follows.

When the reactive group of the water-insoluble polymer is an acid group such as a carboxyl group, a sulfonic group and a phosphoric group, the crosslinking agent is preferably selected from the above compounds (a), (b) and (d).

When the reactive group of the water-insoluble polymer is an amino group or a hydroxyl group, the crosslinking agent is preferably selected from the above compounds (b), (c) and (e).

When the reactive group of the water-insoluble polymer is an isocyanate group or an epoxy group, the crosslinking agent is preferably selected from the above compounds (a), (d) and (e).

Among the above combinations, in view of well controlling the crosslinking reaction to obtain a crosslinked polymer having an adequate crosslinking structure from the water-insoluble polymer, especially preferred is the combination of the water-insoluble polymer containing at least one reactive group selected from the group consisting of acid groups such as a carboxyl group, a sulfonic group and a phosphoric group, an amino group and a hydroxyl group, with the compound (b) containing two or more epoxy groups in a molecule thereof.

The water-insoluble polymer containing an acid group such as a carboxyl group, a sulfonic group and a phosphoric group, an amino group, a hydroxyl group, an isocyanate group, an epoxy group, etc., as the reactive group (crosslinkable functional group) capable of reacting with the above crosslinking agent may be produced by copolymerizing a polymerizable monomer composition containing a monomer having the above reactive group in the above procedure for producing the water-insoluble polymer.

As the polymer containing a salt-forming group such as an acid group and an amino group as the reactive group capable of reacting with the crosslinking agent, there may be used those polymers obtained by copolymerizing the above salt-forming group-containing monomer. Also, as the polymer containing a hydroxyl group as the reactive group capable of reacting with the crosslinking agent, there may be used those polymers obtained by copolymerizing the above hydroxyl group-containing monomer.

As the polymer containing an epoxy group as the reactive group capable of reacting with the crosslinking agent, there may be used those polymers obtained by copolymerizing an epoxy group-containing monomer, more specifically, glycidyl(meth)acrylate. Further, as the polymer containing an isocyanate group as the reactive group capable of reacting with the crosslinking agent, there may be used (i) those polymers obtained by copolymerizing an isocyanate group-containing monomer, for example, isocyanato-ethyl (meth)acrylate, and (ii) those polymers obtained by copolymerizing an isocyanate-terminated prepolymer produced from an unsaturated polyester polyol and an isocyanate.

(Water-Insoluble Crosslinked Polymer Particles Containing a Colorant)

In the present invention, the water-insoluble crosslinked polymer particles containing a colorant is used for enhancing a gloss and a storage stability owing to a good interaction with the water-insoluble organic compound.

It is considered that an adequate crosslinked structure of the crosslinked polymer still allows the water-insoluble organic compound to well included therein, so that the resultant crosslinked polymer exhibits an excellent storage stability even when the crosslinked polymer has a swelled-up a polymer structure owing to the inclusion of the water-insoluble organic compound therein. When a crosslinking degree of the crosslinked polymer is too high, the water-insoluble organic compound tends to be hardly included in the crosslinked polymer, whereas when the polymer has no crosslink, the polymer particles tend to be fused together owing to the swelled-up polymer structure.

The above crosslinked polymer particles may be produced by (i) a production process including a step I of obtaining colorant-containing water-insoluble polymer particles from a colorant and a water-insoluble polymer, and a step II of reacting the colorant-containing water-insoluble polymer particles obtained in the step I with a crosslinking agent to produce crosslinked polymer particles, and (ii) a production process including a step III of subjecting a water-insoluble polymer and a crosslinking agent to crosslinking reaction to obtain a water-insoluble crosslinked polymer, and a step IV of obtaining crosslinked polymer particles from the water-insoluble crosslinked polymer thus obtained in the step III, and a colorant. Among these production processes, preferred is the production process (i) in view of a good storage stability and a facilitated production of the crosslinked polymer particles.

The production process (i) may be performed, for example, by the following steps (1) to (3):

(1) dispersing a mixture containing a water-insoluble polymer, an organic solvent, a colorant and water as well as a neutralizing agent, if required, to obtain a dispersion of water-insoluble polymer particles containing the colorant;

(2) removing the organic solvent from the dispersion obtained in the step (1) to obtain a water dispersion of the water-insoluble polymer particles containing the colorant; and (3) subjecting the water dispersion of the water-insoluble polymer particles containing the colorant which is obtained in the above step (2), and a crosslinking agent to crosslinking reaction to obtain the crosslinked polymer particles.

In the step (1), preferably, the water-insoluble polymer is first dissolved in the organic solvent, and then the colorant and water together with optional components such as a neutralizing agent and a surfactant, if required, are added to the thus obtained organic solvent solution under mixing to obtain a dispersion of an oil-in-water type. The content of the colorant in the dispersion is preferably from 5 to 50% by weight and more preferably from 10 to 40% by weight. The content of the organic solvent in the dispersion is preferably from 10 to 70% by weight and more preferably from 10 to 50% by weight. The content of the water-insoluble polymer in the dispersion is preferably from 2 to 40% by weight and more preferably from 3 to 20% by weight, and the content of water in the dispersion is preferably from 10 to 70% by weight and more preferably from 20 to 70% by weight.

When the water-insoluble polymer contains a salt-forming group, the neutralizing agent is preferably used in the dispersion. The degree of neutralization of the salt-forming group in the polymer with the neutralizing agent is not particularly limited. In general, the degree of neutralization is preferably controlled such that the finally obtained water dispersion exhibits a neutral liquid property, for example, a pH of 4.5 to 10. The pH of the dispersion may also be determined from the desired degree of neutralization for the water-insoluble polymer. The neutralizing agent used in the present invention are those exemplified above. In addition, the water-insoluble polymer may be previously neutralized.

Examples of the organic solvents include alcohol solvents such as ethanol, isopropanol and isobutanol; ketone solvents such as acetone, methyl ethyl ketone, methyl isobutyl ketone and diethyl ketone; and ether solvents such as dibutyl ether, tetrahydrofuran and dioxane. The solubility of these organic solvent in 100 g of water is preferably 5 g or higher and more preferably 10 g or higher, more specifically preferably from 5 to 80 g and more preferably from 10 to 50 g as measured at 20° C. Among these organic solvents, preferred are methyl ethyl ketone and methyl isobutyl ketone.

The method for dispersing the mixture in the step (1) is not particularly limited. The polymer particles may be finely divided into fine particles having a desired average particle size only by a substantial dispersion procedure. Preferably, the mixture is first subjected to a preliminary dispersion procedure, and then to the substantial dispersion procedure by applying a shear stress thereto so as to control the average particle size of the obtained polymer particles to a desired value. The dispersion procedure in the step (1) is preferably conducted at a temperature of from 5 to 50° C. and more preferably from 10 to 35° C. The dispersing time is preferably from 1 to 30 h and more preferably from 2 to 25 h.

Upon subjecting the mixture to the preliminary dispersion procedure, there may be used ordinary mixing or stirring devices such as anchor blades. Examples of the preferred mixing or stirring devices include high-speed mixers or stirrers such as "Ultra Disper" (tradename: available from Asada Tekko Co., Ltd., "Ebara Milder" (tradename: available from Ebara Seisakusho Co., Ltd.), "TK Homomixer", "TK Pipeline Mixer", "TK Homo Jetter", "TK Homomic Line Flow" and "Filmix" (tradenames: all available from Primix Co., Ltd.), "Clearmix" (tradename: available from M-Technic Co., Ltd.) and "K. D. Mill" (tradename: available from Kinetics Dispersion Inc.).

To apply the shear stress to the mixture in the substantial dispersion procedure, there may be used, for example, kneading machines such as roll mills, beads mills, kneaders and extruders, homo-valve-type high-pressure homogenizers such as typically "High-Pressure Homogenizer" (tradename: available from Izumi Food Machinery Co., Ltd.) and "Mini-Labo 8.3H Model" (tradename: available from Rannie Corp.), and chamber-type high-pressure homogenizers such as "Micro Fluidizer" (tradename: available from Microfluidics Inc.), "Nanomizer" (tradename: available from Nanomizer Co., Ltd.), "Altimizer" (tradename: available from Sugino Machine Co., Ltd.), "Genus PY" (tradename: available from Hakusui Kagaku Co., Ltd.) and "DeBEE 2000" (tradename: Nippon BEE Co., Ltd.). These apparatuses may be used in combination of any two or more thereof. Among these apparatuses, in the case where the pigment is contained in the mixture, the high-pressure homogenizers are preferred in view of reducing a particle size of the pigment.

In the step (2), the organic solvent is removed from the thus obtained dispersion by known methods to render the dispersion aqueous, thereby obtaining a water dispersion of the polymer particles containing the colorant. The organic solvent is preferably substantially completely removed from the thus obtained water dispersion of the polymer particles. However, the residual organic solvent may be present in the water dispersion unless the objects and effects of the present invention are adversely affected by the residual organic solvent. If required, the residual organic solvent may also be removed again from the water dispersion after subjected to the crosslinking reaction. The content of the residual organic solvent in the resultant water dispersion is preferably 0.1% by weight or lower and more preferably 0.01% by weight or lower.

In the thus-obtained water dispersion of the polymer particles containing the colorant, solid components made of the polymer particles containing the colorant are dispersed in water as a main solvent. The configuration of the polymer particles is not particularly limited as long as the particles are formed from at least the colorant and the polymer. Examples of the configuration of the polymer particles include the particle configuration in which the colorant is enclosed in the respective polymer particles, the particle configuration in which the colorant is uniformly dispersed in the respective polymer particles, and the particle configuration in which the colorant is exposed onto a surface of the respective polymer particles.

In the step (3), the thus obtained water dispersion of the polymer particles containing the colorant are reacted with the crosslinking agent to obtain the crosslinked polymer particles. The catalyst, solvent, temperature and time used in the crosslinking reaction may be appropriately determined depending upon the crosslinking agent used. In view of a good gloss and a good storage stability of the resultant polymer particles as well as a facilitated production thereof, there may be used the method of mixing the water-insoluble polymer particles containing the colorant with the crosslinking agent, and more preferably mixing the water dispersion of the water-insoluble polymer particles containing the colorant with the crosslinking agent, to subject the polymer to crosslinking reaction, thereby obtaining the crosslinked polymer particles. By this method, it is considered that the polymer particles are prevented from suffering from excessive swelling in water dispersion and water-based ink while keeping a good fusibility over a recording paper, and the resultant water-based ink is therefore enhanced in storage stability while maintaining a good gloss.

The crosslinking reaction time is preferably from 0.5 to 10 h and more preferably from 1 to 5 h. The crosslinking reaction temperature is preferably from 40 to 95° C.

The amount of the crosslinking agent used in the above reaction is preferably 0.5 part by weight or larger, more preferably 0.7 part by weight or larger, still more preferably 0.85 part by weight or larger, further still more preferably 1 part by weight or larger and most preferably 1.5 parts by weight or larger on the basis of 100 parts by weight of the water-insoluble polymer in view of a good gloss and a good storage stability of the resultant crosslinked polymer particles. The upper limit of the amount of the crosslinking agent used is preferably 9.5 parts by weight or smaller, more preferably 8 parts by weight or smaller, still more preferably 7.5 parts by weight or smaller, further still more preferably 7.0 parts by weight or smaller, further still more preferably 6.5 parts by weight or smaller and most preferably 6.0 parts by weight or smaller. From these viewpoints, the amount of the crosslinking agent used is preferably from 0.5 to 9.5 parts by weight, more preferably from 0.5 to 8 parts by weight, more preferably from 0.7 to 8 parts by weight, still more preferably from 0.85 to 7.5 parts by weight, further still more preferably from 1 to 7.0 parts by weight, further still more preferably 1 to 6.5 parts by weight and most preferably from 1.5 to 6 parts by weight on the basis of 100 parts by weight of the water-insoluble polymer.

Also, upon crosslinking the water-insoluble polymer, the dispersion of the polymer particles containing the colorant which is obtained in the step (1) may be mixed with the crosslinking agent. In this case, the dispersion of the crosslinked polymer particles obtained in the crosslinking step may be subjected to removal of the organic solvent therefrom in the same manner as in the above (2), thereby enabling production of the water dispersion of the crosslinked polymer particles containing the colorant.

The weight-average segment molecular weight of the crosslinked polymer particles which is calculated from the following formula (1) is preferably 1,100 or more, more preferably 1,400 or more, still more preferably 1,500 or more, further still more preferably 1,600 or more and most preferably 2,000 or more in view of a good gloss and a good storage stability of the resultant polymer particles. Also, the upper limit of the weight-average segment molecular weight of the crosslinked polymer particles is preferably 20,000 or less, more preferably 15,000 or less, still more preferably 10,000 or less and most preferably 7,000 or less. From these viewpoints, the weight-average segment molecular weight of the crosslinked polymer particles is preferably from 1,100 to 20,000, more preferably from 1,400 to 20,000, still more preferably from 1,500 to 15,000, further still more preferably from 1,600 to 10,000 and most preferably from 2,000 to 7,000.

Weight-average segment molecular weight=[(weigh-average molecular weight of the water-insoluble polymer)/(number of molar equivalents of the crosslinking agent to be reacted with 1 mol of the water-insoluble polymer+1)]  (1), with the proviso that when a ratio of [(number of molar equivalents of the crosslinking agent to be reacted with 1 mol of the water-insoluble polymer)/(number of moles of reactive groups capable of reacting with the crosslinking agent which are contained in the water-insoluble polymer)] is more than 1 (>1), the number of molar equivalents of the crosslinking agent to be reacted with 1 mol of the water-insoluble polymer is equal to the number of moles of reactive groups capable of reacting with the crosslinking agent which are contained in 1 mol of the water-insoluble polymer.

The weight-average segment molecular weight of the crosslinked polymer particles represented by the above formula (1) means a weight-average molecular weight of a segment of the crosslinked polymer which is obtained on the assumption that the crosslinked polymer is cut at a crosslinked site formed by the crosslinking agent. The smaller segment means that the crosslinked polymer has a larger number of crosslinked sites formed by reacting with the crosslinking agent. Therefore, in order to reduce the weight-average segment molecular weight, the number of the crosslinked sites in the crosslinked polymer may be increased by using a larger amount of the crosslinking agent.

The "number of molar equivalents of the crosslinking agent to be reacted with 1 mol of the water-insoluble polymer" in the above formula means the value obtained by multiplying the number of moles of the crosslinking agent to be reacted with 1 mol of the water-insoluble polymer by the number of reactive groups contained in one molecule of the crosslinking agent. In addition, the "proviso" clause in the formula (1) means that when the number of molar equivalents of the crosslinking agent is larger than the number of moles of the reactive groups contained in the water-insoluble polymer, the number of crosslinked sites is identical to the number of moles of the reactive groups.

The ratio of [(number of molar equivalents of the crosslinking agent to be reacted with 1 mol of the water-insoluble polymer)/(number of moles of reactive groups capable of reacting with the crosslinking agent which are contained in the water-insoluble polymer)] is preferably from 0.01 to 0.8, more preferably from 0.02 to 0.6 and still more preferably from 0.03 to 0.5 in view of a good storage stability. The "number of molar equivalents of the crosslinking agent to be reacted with 1 mol of the water-insoluble polymer" of 0 (zero) means such a case where no crosslinking agent is present in the reaction system. In this case, the weight-average segment molecular weight is equal to the weight-average molecular weight of the water-insoluble polymer. The "number of molar equivalents of the crosslinking agent to be reacted with 1 mol of the water-insoluble polymer" is preferably from 2 to 100, more preferably from 4 to 90 and still more preferably from 5 to 80 in view of a good storage stability and a good reactivity. Also, the "number of moles of reactive groups capable of reacting with the crosslinking agent which are contained in the water-insoluble polymer" is preferably from 10 to 1000, more preferably from 20 to 800 and still more preferably from 30 to 500 in view of a good storage stability and a good reactivity.

The weight-average molecular weight of the crosslinked polymer is preferably 120,000 or more, more preferably 150,000 or more and still more preferably 200,000 or more in view of a good gloss and a good storage stability of the resultant polymer. The upper limit of the weight-average molecular weight of the crosslinked polymer is preferably 2,500,000 or less, more preferably 2,200,000 or less, still more preferably 1,800,000 or less and further still more preferably 1,600,000 or less. From these viewpoints, the weight-average molecular weight of the crosslinked polymer is preferably from 120,000 to 2,500,000, more preferably from 150,000 to 2,200,000, still more preferably from 200,000 to 1,800,000 and further still more preferably from 200,000 to 1,600,000. Since the water-insoluble polymers are crosslinked with each other through the crosslinking agent, the weight-average molecular weight of the crosslinked polymer is larger than the weight-average molecular weight of the water-insoluble polymer. The weight-average molecular weight of the crosslinked polymer may be measured by the method described in Examples below.

The ratio of the weight-average molecular weight of the water-insoluble crosslinked polymer to the weight-average molecular weight of the water-insoluble polymer [(weight-average molecular weight of the water-insoluble crosslinked polymer)/(weight-average molecular weight of the water-insoluble polymer)] is preferably from 2 to 40, more preferably from 2.5 to 40 and still more preferably from 2.5 to 30 in view of a good gloss and a good storage stability.

The weight-average molecular weight of the crosslinked polymer may be increased by (1) the method of using the water-insoluble polymer having a larger weight-average molecular weight, and (2) the method of increasing an amount of the crosslinking agent used to reduce the above weight-average segment molecular weight.

The degree of gelation of the water-insoluble crosslinked polymer is preferably kept lower in view of a good gloss. More specifically, it is preferred that the water-insoluble crosslinked polymer can be substantially completely dissolved in THF (tetrahydrofuran), and the obtained solution is transparent when observed by naked eyes at 25° C.

(Water Dispersion Containing Crosslinked Polymer Particles and Water-Insoluble Organic Compound)

The water dispersion for ink-jet printing according to the present invention contains the crosslinked polymer particles and the water-insoluble organic compound.

The water dispersion for ink-jet printing according to the present invention may be produced by the process including the above steps (1) to (3) wherein the water-insoluble organic compound is allowed to exist during or after at least one of the steps (1) to (3).

In view of a good storage stability, the water dispersion for ink-jet printing according to the present invention is preferably produced by mixing the water dispersion of the polymer particles containing the colorant which are obtained in the step (2) with the water-insoluble organic compound, or by mixing the water dispersion of the crosslinked polymer particles obtained in the step (3) with the water-insoluble organic compound.

The mixing ratio between the water dispersion of the polymer particles containing the colorant which is obtained in the step (2) and the water-insoluble organic compound is adjusted such that the water-insoluble organic compound is used in an amount of preferably from 1 to 100 parts by weight, more preferably from 3 to 50 parts by weight and still more preferably from 3 to 30 parts by weight on the basis of 100 parts by weight of solid components contained in the water dispersion of the polymer particles containing the colorant (sum of the colorant and the polymer), in view of a good gloss and a good storage stability.

The mixing ratio between the water dispersion of the crosslinked polymer particles which is obtained in the step (3) and the water-insoluble organic compound is adjusted such that the water-insoluble organic compound is used in an amount of preferably from 1 to 100 parts by weight, more preferably from 3 to 50 parts by weight and still more preferably from 3 to 30 parts by weight on the basis of 100 parts by weight of solid components contained in the water dispersion of the crosslinked polymer particles (sum of the colorant and the crosslinked polymer), in view of a good gloss and a good storage stability.

In addition, the amount of the water-insoluble organic compound used is preferably from 5 to 300 parts by weight, more preferably from 15 to 150 parts by weight, still more preferably from 20 to 200 parts by weight and further still more preferably from 30 to 95 parts by weight on the basis of 100 parts by weight of the resultant crosslinked polymer in view of a good gloss and a good storage stability.

When mixing the water-insoluble organic compound with the water dispersion of the polymer particles containing the colorant or the water dispersion of the crosslinked polymer particles, the water-insoluble organic compound may be added to the respective water dispersions, or vice versa. The mixing temperature is preferably from about 5 to 50° C. Also, after mixing, the resultant mixture is preferably re-dispersed according to the above dispersing method.

In the water dispersion of the present invention, at least a part of the water-insoluble organic compound is included in the crosslinked polymer particles. Thus, the water dispersion of the present invention is in the form of a water dispersion of the water-insoluble crosslinked polymer particles containing the water-insoluble organic compound and the colorant.

The content of the crosslinked polymer particles in the water dispersion of the present invention is preferably from 5 to 30% by weight and more preferably from 10 to 25% by weight in view of a good gloss and a good storage stability. The content of the water-insoluble organic compound in the water dispersion of the present invention is preferably from 0.1 to 5% by weight, more preferably from 0.2 to 4% by weight and still more preferably from 0.3 to 3% by weight in view of a good gloss and a good storage stability. The content of water in the water dispersion of the present invention is preferably from 50 to 80% by weight and more preferably from 60 to 80% by weight.

The water dispersion of the present invention may be directly used as a water-based ink. Alternatively, various additives ordinarily used in water-based inks for ink-jet printing such as wetting agents, penetrants, dispersants, viscosity modifiers, defoaming agents, mildew-proof agents and anti-corrosion agents may be added to the water dispersion upon use.

The content of the crosslinked polymer particles in the water-based ink of the present invention is preferably from 1 to 15% by weight and more preferably from 2 to 10% by weight in view of a good gloss and a good storage stability. The content of the water-insoluble organic compound in the water-based ink of the present invention is preferably from 0.1 to 5% by weight, more preferably from 0.2 to 4% by weight and still more preferably from 0.3 to 3% by weight in view of a good gloss and a good storage stability. The content of water in the water-based ink of the present invention is preferably from 50 to 80% by weight and more preferably from 60 to 80% by weight.

The average particle size of the crosslinked polymer particles contained in the resultant water dispersion and water-based ink is preferably from 0.01 to 0.5 μm, more preferably from 0.03 to 0.3 μm and still more preferably from 0.05 to 0.2 μm in view of preventing clogging of nozzles in a printer and enhancing the dispersion stability. Meanwhile, the average particle size of the crosslinked polymer particles can be measured by the method described in the below-mentioned Examples.

Meanwhile, even in the case where the water-insoluble organic compound is included in the crosslinked polymer particles, the average particle size of the crosslinked polymer particles preferably lies in the substantially same range as described above.

The water-based ink for ink-jet printing according to the present invention can provide prints having a high gloss when printed on a coated paper. Examples of the coated paper include photographic papers for ink-jet printing which include a void-type glossy medium having a 60° gloss of 10 to 45, etc. Here, the "gloss" value may be measured by the method described in Examples below. Such photographic papers are commercially available. Examples of the suitable commercially available photographic papers include "KA450PSK (tradename)" available from Seiko Epson Co., Ltd., etc.

The ink-jet printing method using the water-based ink of the present invention is not particularly limited, and is suitably applied to piezoelectric-type ink-jet printers.

EXAMPLES

In the following production examples, examples and comparative examples, the "part(s)" and "%" indicate "part(s) by weight" and "% by weight", respectively, unless otherwise specified.

Meanwhile, the weight-average molecular weights of the water-insoluble polymer and the water-insoluble crosslinked polymer were respectively measured by the following methods.

(i) Weight-Average Molecular Weight (Mw) of Water-Insoluble Polymer

The weight-average molecular weight of the water-insoluble polymer was measured by gel chromatography using N,N-dimethyl formamide containing 60 mmol/L of phosphoric acid and 50 mmol/L of lithium bromide as a solvent and using a polystyrene as a standard substance. Also, as a column for the gel chromatography, there was used TSK-GEL □-M×2 in HLC-8120GPC available from Tosoh Corporation (Flow speed: 1 mL/min).

(ii) Weight-Average Molecular Weight (Mw) of Water-Insoluble Crosslinked Polymer In the same manner as described in the following Examples and Comparative Examples except for using no pigment, the respective components were mixed and stirred at 25° C. for 30 min, and the organic solvent was removed from the resultant mixed solution to obtain an emulsion.

The thus obtained emulsion containing a water-insoluble polymer was mixed and reacted with the crosslinking agent in the same ratio and under the same conditions as used in the following Examples and Comparative Examples, thereby obtaining an emulsion containing a water-insoluble crosslinked polymer. The thus obtained emulsion was freeze-dried to measure a weight-average molecular weight of the water-insoluble crosslinked polymer under the same conditions as used for the water-insoluble polymer in the above (i).

Production Examples 1

Production of Water-Insoluble Polymer A

Twenty parts of methyl ethyl ketone and 0.12 part of a chain transfer agent (2-mercaptoethanol) together with 10% of 200 parts of respective monomers shown in Table 1 were charged into a reaction vessel and mixed with each other, and then the reaction vessel was fully purged with a nitrogen gas to thereby obtain a mixed solution.

Separately, remaining 90% of the monomers shown in Table 1 was charged into a dropping funnel, and further 1.08 parts of the chain transfer agent, 60 parts of methyl ethyl ketone and 1.2 parts of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. under stirring in a nitrogen atmosphere, and then the mixed solution in the dropping funnel was gradually dropped thereinto over 3 h. After the elapse of 2 h from completion of the dropping while maintaining the temperature at 65° C., a solution prepared by dissolving 0.3 part by weight of the radical polymerization initiator in 5 parts of methyl ethyl ketone was added to the mixed solution, and the resultant reaction solution was further aged at 65° C. for 2 h and at 70° C. for 2 h. Further, 115 parts of methyl ethyl ketone was added to the reaction solution, and the obtained solution was stirred for 30 min to obtain a solution of a polymer A having a solid content (effective ingredient content) of about 50%. As a result, it was confirmed that the thus obtained water-insoluble polymer A had a weight-average molecular weight (Mw) of 36,000.

Production Examples 2 to 7

Production of Water-Insoluble Polymers B to G

The reaction was performed in the same manner as in Production Example 1 except that the mixing ratio between the respective monomers used was varied as shown in Table 1, and the amounts of the chain transfer agent (2-mercaptoethanol) added to the reaction vessel and the dropping funnel were varied as shown in Table 2, thereby obtaining solutions containing water-insoluble polymers B to G, respectively. The weight-average molecular weights (Mw) of the thus obtained water-insoluble polymers B to G were measured by the above method. The results are shown in Table 2.

TABLE 1

|  | Production Examples | | |
| --- | --- | --- | --- |
| Kind of Monomer (effective ingredient content: %) | 1 to 3 | 4 to 6 | 7 |
| (a) Methacrylic acid | 12 | 14 | 16 |
| (b) Styrene macromer | 15 | 15 | 15 |
| (c) Benzyl methacrylate | 48 | 46 | 39 |
| (d) M-90G | 5 | 5 | 15 |
| (e) PP-800 | 20 | 20 | 15 |

Meanwhile, details of the respective compounds shown in Table 1 are as follows.

(b) Styrene Macromer:

"AS-6S" (tradename) available from Toagosei Co., Ltd.; number-average molecular weight: 6000; polymerizable functional group: methacryloyloxy group (d) M-90G:

Polyethylene glycol monomethacrylate (average molar number of addition of ethyleneoxide: 9; end group: methyl; "NK-ESTER M-90G" (tradename) available from Shin-Nakamura Kagaku Kogyo Co., Ltd.

(e) PP-800:

Polypropylene glycol monomethacrylate (average molar number of addition of propyleneoxide: 13; end group: hydroxyl; "BLEMMER PP-800" (tradename) available from NOF Corporation.

TABLE 2

|  | Water-insoluble polymers | | | |
| --- | --- | --- | --- | --- |
|  | A | B | C | D |
| Production Examples | 1 | 2 | 3 | 4 |
| Amount of chain transfer agent added (part) | | | | |
| Into a reaction vessel | 0.12 | 0.06 | 0.04 | 0.06 |
| Into a dropping funnel | 1.08 | 0.54 | 0.36 | 0.54 |
| Mw (×10$^3$) | 36 | 100 | 220 | 90 |

|  | Water-insoluble polymers | | |
| --- | --- | --- | --- |
|  | E | F | G |
| Production Examples | 5 | 6 | 7 |
| Amount of chain transfer agent added (part) | | | |
| Into a reaction vessel | 0.05 | 0.04 | 0.03 |
| Into a dropping funnel | 0.45 | 0.36 | 0.27 |
| Mw (×10$^3$) | 150 | 230 | 400 |

Synthesis Example 1

Production of Water-Insoluble Organic Compound A

One hundred parts of phthalic anhydride, 40 parts of an adduct of 2-ethylhexyl alcohol with 4 mol of ethyleneoxide "NEWCOL 1004 (tradename)" available from Nippon Nyukazai Co., Ltd., and 0.5 part of tetraisopropoxy titanate were charged into a reaction vessel and mixed with each other. After fully purging the reaction vessel with a nitrogen gas, the contents of the reaction vessel were heated to 220° C. and subjected to esterification reaction. The obtained reaction mixture was further reacted under reduced pressure at the same temperature to complete the esterification reaction. Then, an excess amount of the alcohol was removed from the obtained reaction solution by topping, thereby obtaining a phthalic diester-based water-insoluble organic compound A.

As a result, it was confirmed that the obtained water-insoluble organic compound A contained phthalic acid as a basic structure, and an adduct of 2-ethylhexyl with 4 mol of ethyleneoxide was bonded to each terminal end thereof. The Log P value of the water-insoluble organic compound A calculated from a Log P value of phthalic acid of 0.57, a Log P value of ethyleneoxide of −0.27 and a Log P value of 2-ethylhexyl of 3.19 was 6.23 (=0.57−0.27×8+3.91×2).

Synthesis Example 2

Production of Water-Insoluble Organic Compound B

Seventy parts of adipic acid, 450 parts of an adduct of 2-ethylhexyl alcohol with 4 mol of ethyleneoxide and 2 mol of propyleneoxide available from Nippon Nyukazai Co., Ltd., and 0.5 part of tetraisopropoxy titanate were charged into a reaction vessel and mixed with each other. After fully purging the reaction vessel with a nitrogen gas, the contents of the reaction vessel were heated to 230° C. and subjected to esterification reaction. The obtained reaction mixture was further reacted under reduced pressure at the same temperature to complete the esterification reaction. Then, an excess amount of the alcohol was removed from the obtained reaction solution by topping, thereby obtaining an adipic diester-based water-insoluble organic compound B.

As a result, it was confirmed that the obtained water-insoluble organic compound B contained adipic acid as a basic structure, and an adduct of 2-ethylhexyl alcohol with 4 mol of ethyleneoxide and 2 mol of propyleneoxide was bonded to each terminal end thereof. The Log P value of the water-insoluble organic compound B calculated from a Log P value of adipic acid of 0.29, a Log P value of ethyleneoxide of −0.27, a Log P value of propyleneoxide of 0.14 and a Log P value of 2-ethylhexyl of 3.19 was 6.51 (=0.29−0.27×8+0.14×4+3.91×2).

Example 1

Two hundred parts of the polymer A produced by drying the polymer solution obtained in Production Example 1 under reduced pressure was dissolved in 400 parts of methyl ethyl ketone. Further, 16 parts of a neutralizing agent (a 5N sodium hydroxide aqueous solution) and 1600 parts of ion-exchanged water were added to the resultant solution to neutralize a salt-forming group of the polymer (degree of neutralization: 60%). Next, 680 parts of a quinacridone pigment (C.I. Pigment Violet 19 "Hostaperm Red E5B02 (tradename)" available from Clariant Japan Co., Ltd.) was added into the reaction solution, and then mixed and dispersed at 20° C. for 2 h using a beads mill-type dispersing apparatus "UAM05 Model" (using zirconia beads having a particle size of 50 μm) available from Kotobuki Kogyo Co., Ltd. The thus obtained dispersion was further dispersed under a pressure of 200 MPa by passing through a dispersing apparatus "MICROFLUIDIZER" (tradename) available from Microfluidics Corp., 10 times.

The resultant dispersion was mixed with 250 parts of ion-exchanged water under stirring, and then methyl ethyl ketone was removed from the resultant mixture under reduced pressure at 60° C., followed by removing a part of water therefrom. The obtained mixture was filtered through a 5 μm-mesh filter (acetyl cellulose membrane; outer diameter: 2.5 cm; available from Fuji Photo Film Co., Ltd.) fitted to a 25 mL syringe without a needle available from Terumo Co., Ltd., to remove coarse particles therefrom, thereby obtaining a water dispersion of pigment-containing water-insoluble polymer particles having a solid content of 18%.

Next, 0.11 part of a crosslinking agent "DENACOL EX-810" (molecular weight: 216; epoxy equivalent: 113) available from Nagase ChemteX Corporation, and then 0.80 part of ion-exchanged water were successively added to 80 parts of the water dispersion (water-insoluble polymer in the dispersion: 3.3 parts), and the resultant mixture was stirred at 80° C. for 3 h, thereby obtaining a water dispersion of water-insoluble crosslinked polymer particles. At this time, the amount of the crosslinking agent used was 3.3 parts on the basis of 100 parts of the water-insoluble polymer, the weight-average segment molecular weight of the crosslinked polymer was 3100, and the weight-average molecular weight (Mw) of the crosslinked polymer was 300,000.

Also, the weight-average segment molecular weight of the crosslinked polymer as calculated from the above formula (1): [(weigh-average molecular weight of the water-insoluble polymer)/(number of molar equivalents of the crosslinking agent to be reacted with 1 mol of the water-insoluble polymer)+1] was 3100 [=36000/(10.6+1)].

In this case, since the crosslinking agent "DENACOL EX-810" (epoxy equivalent: 113) was used in an amount of 0.11 part on the basis of 80 parts of the water dispersion (water-insoluble polymer in the dispersion: 3.3 parts), the number of molar equivalents of the crosslinking agent to be reacted with 1 mol of the water-insoluble polymer was calculated as follows:

(0.11/113)/(3.3/weight-average molecular weight of the water-insoluble polymer)=10.6.

Here, since the crosslinking agent "DENACOL EX-810" is reacted with a carboxyl group and a hydroxyl group, the number of moles of the reactive groups contained in 1 mol of the water-insoluble polymer which are capable of reacting with the crosslinking agent is equal to a total number of moles of methacrylic acid (molecular weight: 86) and PP-800 (molecular weight: 840) contained in 1 mol of the water-insoluble polymer, i.e., calculated as follows:

36000×0.12/86+36000×0.2/840=58.8 mol.

Accordingly, the ratio of [(number of molar equivalents of the crosslinking agent to be reacted with 1 mol of the water-insoluble polymer)/(number of moles of reactive groups capable of reacting with the crosslinking agent which are contained in the water-insoluble polymer)] is calculated as follows:

10.6/58.8=0.18.

As a result, it was recognized that the above value does not correspond to the condition defined in the "proviso" clause of the formula (1).

Forty parts of the water dispersion of the thus obtained crosslinked polymer particles was mixed with 1 part of the water-insoluble organic compound A obtained in Synthesis Example 1 under stirring to incorporate the water-insoluble organic compound in the polymer particles. The resultant mixed solution was mixed with 10 parts of glycerol, 7 parts of triethylene glycol monobutyl ether, 1 part of "SURFYNOL 465" available from Nissin Chemical Industry Co., Ltd., 0.3 part of "Ploxel XL2" available from Avecia KK, 1.0 part of triethylene amine and 39.7 parts of ion-exchanged water, and the resultant mixed solution was filtered through a 1.2 μm-mesh filter (acetyl cellulose membrane; outer diameter: 2.5 cm; available from Fuji Photo Film Co., Ltd.) fitted to a 25 mL syringe without a needle to remove coarse particles therefrom, thereby obtaining a water-based ink.

The gloss and storage stability of the thus obtained water-based ink were evaluated by the below-mentioned methods.

Example 2

The water dispersion of crosslinked polymer particles was produced in the same manner as in Example 1 except for adding 0.21 part of the crosslinking agent "DENACOL EX-810" to 80 parts of the water dispersion of the pigment-containing water-insoluble polymer particles having a solid content of 18%. At this time, the crosslinking agent was used in an amount of 6.3 parts on the basis of 100 parts of the water-insoluble polymer. Subsequently, the ink was produced and then evaluated in the same manner as in Example 1.

Example 3

The water dispersion of pigment-containing water-insoluble polymer particles having a solid content of 18% was produced in the same manner as in Example 1 except for using 200 parts of the polymer B produced by drying the polymer solution obtained in Production Example 2 under reduced pressure.

Next, 0.077 part of the crosslinking agent "DENACOL EX-810" and then 0.80 part of ion-exchanged water were successively added to 80 parts of the water dispersion (water-insoluble polymer in the dispersion: 3.3 parts), and the resultant mixture was stirred at 80° C. for 3 h, thereby obtaining a water dispersion of crosslinked polymer particles. At this time, the crosslinking agent was used in an amount of 2.3 parts on the basis of 100 parts of the water-insoluble polymer.

Forty parts of the water dispersion of the thus obtained crosslinked polymer particles was mixed with 0.8 part of octylbenzyl phthalate (OBzP; Log P value: 6.79) as a water-insoluble organic compound under stirring to incorporate the water-insoluble organic compound in the crosslinked polymer particles. Subsequently, the resultant mixed solution was treated in the same manner as in Example 1 except for using 39.9 parts of ion-exchanged water to obtain a water-based ink, and then the thus obtained water-based ink was evaluated in the same manner as in Example 1.

Example 4

The water dispersion of crosslinked polymer particles was produced in the same manner as in Example 3 except for adding 0.026 part of the crosslinking agent "DENACOL EX-810" to 80 parts of the water dispersion of the pigment-containing water-insoluble polymer particles having a solid content of 18%. At this time, the crosslinking agent was used in an amount of 0.8 part on the basis of 100 parts of the water-insoluble polymer. Subsequently, the ink was produced and evaluated in the same manner as in Example 3.

Example 5

The water dispersion of pigment-containing water-insoluble polymer particles having a solid content of 18% was produced in the same manner as in Example 1 except for using 200 parts of the polymer C produced by drying the polymer solution obtained in Production Example 3 under reduced pressure.

Next, 0.026 part of the crosslinking agent "DENACOL EX-810" and then 0.80 part of ion-exchanged water were successively added to 80 parts of the water dispersion (water-insoluble polymer in the dispersion: 3.3 parts), and the resultant mixture was stirred at 80° C. for 3 h, thereby obtaining a water dispersion of crosslinked polymer particles. At this time, the crosslinking agent was used in an amount of 0.8 part on the basis of 100 parts of the water-insoluble polymer.

Forty parts of the water dispersion of the thus obtained crosslinked polymer particles was mixed with 0.8 part of OBzP as a water-insoluble organic compound under stirring to incorporate the water-insoluble organic compound in the polymer particles. Subsequently, the resultant mixed solution was treated in the same manner as in Example 3 to obtain a water-based ink, and then the thus obtained water-based ink was evaluated in the same manner as in Example 3.

Example 6

The water dispersion of crosslinked polymer particles was produced in the same manner as in Example 5 except for adding 0.129 part of the crosslinking agent "DENACOL EX-810" to 80 parts of the water dispersion of the water-insoluble polymer particles obtained in Example 5. At this time, the crosslinking agent was used in an amount of 3.9 parts on the basis of 100 parts of the water-insoluble polymer. Subsequently, the ink was produced and then evaluated in the same manner as in Example 3.

Example 7

The water dispersion of pigment-containing water-insoluble polymer particles having a solid content of 18% was produced in the same manner as in Example 1 except for using 200 parts of the polymer D produced by drying the polymer solution obtained in Production Example 4 under reduced pressure.

Next, 0.13 part of the crosslinking agent "DENACOL EX-810" and then 0.80 part of ion-exchanged water were successively added to 80 parts of the water dispersion (water-insoluble polymer in the dispersion: 3.3 parts), and the resultant mixture was stirred at 80° C. for 3 h, thereby obtaining a water dispersion of crosslinked polymer particles. At this time, the crosslinking agent was used in an amount of 3.9 parts on the basis of 100 parts of the water-insoluble polymer.

Forty parts of the water dispersion of the thus obtained crosslinked polymer particles was mixed with 1.5 parts of the water-insoluble organic compound B obtained in Synthesis Example 2 under stirring to incorporate the water-insoluble organic compound in the crosslinked polymer particles. Subsequently, the resultant mixed solution was treated in the same manner as in Example 1 except for using 39.2 parts of ion-exchanged water to obtain a water-based ink, and then the thus obtained water-based ink was evaluated in the same manner as in Example 1.

Example 8

The water dispersion of crosslinked polymer particles was produced in the same manner as in Example 7 except for adding 0.18 part of the crosslinking agent "DENACOL EX-810" to 80 parts of the water dispersion of the pigment-containing water-insoluble polymer particles having a solid content of 18%. At this time, the crosslinking agent was used in an amount of 5.5 parts on the basis of 100 parts of the water-insoluble polymer. Subsequently, the ink was produced and then evaluated in the same manner as in Example 7.

Example 9

The water dispersion of pigment-containing water-insoluble polymer particles having a solid content of 18% was produced in the same manner as in Example 1 except for using 200 parts of the polymer E produced by drying the polymer solution obtained in Production Example 5 under reduced pressure.

Next, 0.063 part of the crosslinking agent "DENACOL EX-810" and then 0.80 part of ion-exchanged water were successively added to 80 parts of the water dispersion (water-insoluble polymer in the dispersion: 3.3 parts), and the resultant mixture was stirred at 80° C. for 3 h, thereby obtaining a water dispersion of crosslinked polymer particles. At this time, the crosslinking agent was used in an amount of 1.9 parts on the basis of 100 parts of the water-insoluble polymer.

Forty parts of the water dispersion of the thus obtained crosslinked polymer particles was mixed with 0.8 part of di-n-butyl sebacate (DBS; Log P value: 6.30) as a water-insoluble organic compound under stirring to incorporate the water-insoluble organic compound in the crosslinked polymer particles. Subsequently, the resultant mixed solution was treated in the same manner as in Example 1 except for using 39.9 parts of ion-exchanged water to obtain a water-based ink, and then the thus obtained water-based ink was evaluated in the same manner as in Example 1.

Example 10

The water dispersion of crosslinked polymer particles was produced in the same manner as in Example 9 except for adding 0.13 part of the crosslinking agent "DENACOL EX-810" to 80 parts of the water dispersion of the water-insoluble polymer particles obtained in Example 9. At this time, the crosslinking agent was used in an amount of 3.9 parts on the basis of 100 parts of the water-insoluble polymer. Subsequently, the ink was produced and then evaluated in the same manner as in Example 9.

Example 11

The water dispersion of crosslinked polymer particles was produced in the same manner as in Example 9 except for adding 0.15 part of the crosslinking agent "DENACOL EX-810" to 80 parts of the water dispersion of the water-insoluble polymer particles obtained in Example 9. At this time, the crosslinking agent was used in an amount of 4.5 parts on the basis of 100 parts of the water-insoluble polymer. Subsequently, the ink was produced and then evaluated in the same manner as in Example 9.

Example 12

The water dispersion of pigment-containing water-insoluble polymer particles having a solid content of 18% was produced in the same manner as in Example 1 except for using 200 parts of the polymer F produced by drying the polymer solution obtained in Production Example 6 under reduced pressure.

Next, 0.12 part of the crosslinking agent "DENACOL EX-810" and then 0.80 part of ion-exchanged water were successively added to 80 parts of the above water dispersion (water-insoluble polymer in the dispersion: 3.3 parts), and the resultant mixture was stirred at 80° C. for 3 h, thereby obtaining a water dispersion of crosslinked polymer particles. At this time, the crosslinking agent was used in an amount of 3.6 parts on the basis of 100 parts of the water-insoluble polymer. Subsequently, the ink was produced and then evaluated in the same manner as in Example 9.

Example 13

The water dispersion of pigment-containing water-insoluble polymer particles having a solid content of 18% was produced in the same manner as in Example 1 except for using 200 parts of the polymer G produced by drying the polymer solution obtained in Production Example 7 under reduced pressure.

Next, 0.069 part of the crosslinking agent "DENACOL EX-810" and then 0.80 part of ion-exchanged water were successively added to 80 parts of the above water dispersion (water-insoluble polymer in the dispersion: 3.3 parts), and the resultant mixture was stirred at 80° C. for 3 h, thereby obtaining a water dispersion of crosslinked polymer particles. At this time, the crosslinking agent was used in an amount of 2.1 parts on the basis of 100 parts of the water-insoluble polymer. Subsequently, the ink was produced and then evaluated in the same manner as in Example 9.

Example 14

The water dispersion of water-insoluble crosslinked polymer particles was produced in the same manner as in Example 1 except for adding 0.31 part of the crosslinking agent "DENACOL EX-810" to 80 parts of the water dispersion of the water-insoluble polymer particles obtained in Example 1. At this time, the crosslinking agent was used in an amount of 9.5 parts on the basis of 100 parts of the water-insoluble polymer. Subsequently, the ink was produced and then evaluated in the same manner as in Example 1. The results of evaluation of the obtained ink are shown in Table 3.

Comparative Example 1

The ink was produced in the same manner as in Example 3 except for using no crosslinking agent, and the properties of the thus obtained ink were evaluated in the same manner as in Example 3.

Comparative Example 2

The ink was produced in the same manner as in Example 10 except for using no water-insoluble organic compound, and the properties of the thus obtained ink were evaluated in the same manner as in Example 10.

Next, the gloss, average particle size and storage stability of the respective water-based inks obtained in the above Examples and Comparative Examples were evaluated by the following methods. The results are shown in Table 3.

(1) Gloss

Solid image printing was carried out on a coated paper (photographic paper <glossy> "KA450PSK (tradename)" available from Seiko Epson Co., Ltd.) using an ink-jet printer "Model EM-930C" (piezoelectric type) available from Seiko Epson Co., Ltd., under the following printing conditions:

Kind of Paper: Photo Printing Paper; and
Mode set: Photo

After allowing the printed paper to stand at 25° C. for 24 h, the 20° gloss thereof was measured 5 times using a glossmeter "HANDY GLOSSMETER PG-1" (tradename) available from Nippon Denshoku Industries Co., Ltd., to obtain an average of the measured values. The larger the average value, the higher the gloss became.

(2) Average Particle Size

Average particle size was measured by using a laser particle analyzing system "ELS-8000" (cumulant analysis) available from Otsuka Denshi Co., Ltd. The measurement was conducted at a temperature of 25° C., an angle between incident light and detector of 90° and a cumulative frequency of 100 times, and a refractive index of water (1.333) was input to the analyzing system as a refractive index of the dispersing medium. The concentration of the water dispersion or the water-based ink to be measured was usually about $5 \times 10^{-3}$% by weight.

(3) Storage Stability

The respective inks shown in Table 2 were filled in a sealed glass container and stored at 70° C. for one week. Thereafter, the average particle size of particles contained in the respective inks thus stored was measured by a particle size measuring apparatus "ELS-8000 (tradename)" available from Otsuka Denshi Co., Ltd., to calculate an increase rate of the particle size from the following formula:

Increase Rate of Particle Size=[Average Particle Size after Storage (particle size after stored at 70° C. for one week)/Average Particle Size before Storage (particle size before stored)]×100.

The closer to 100% the above increase rate, the more excellent the storage stability of the ink became. The results of the measurement were evaluated according to the following ratings:

◯: Increase rate of particle size was less than 200%
Δ: Increase rate of particle size was not less than 200% but less than 250%
X: Increase rate of particle size was more than 250%

TABLE 3

| | Examples | | | | |
| --- | --- | --- | --- | --- | --- |
| | 1 | 2 | 3 | 4 | 5 |
| Water-insoluble polymer | Polymer A | Polymer A | Polymer B | Polymer B | Polymer C |
| Mw of water-insoluble polymer (×10³) | 36 | 36 | 100 | 100 | 220 |
| Crosslinking agent | | | | | |
| Kind | EX-810 | EX-810 | EX-810 | EX-810 | EX-810 |
| Amount used*¹ | 3.3 | 6.3 | 2.3 | 0.8 | 0.8 |
| Number of molar equivalents of crosslinking agent (a)*² | 10.6 | 20.3 | 20.6 | 7.0 | 15.3 |

TABLE 3-continued

| | | | | | |
|---|---|---|---|---|---|
| Number of moles of reactive groups (b)*3 | 58.8 | 58.8 | 163.3 | 163.3 | 359.3 |
| (a)/(b) | 0.18 | 0.35 | 0.13 | 0.04 | 0.04 |
| Weight-average segment molecular weight | 3100 | 1690 | 4630 | 12500 | 13500 |
| Mw of crosslinked polymer ($\times 10^4$) | 30 | 85 | 44 | 15 | 34 |
| Water-insoluble organic compound | | | | | |
| Kind | Compound A | Compound A | OBzP | OBzP | OBzP |
| Log P | 6.23 | 6.23 | 6.79 | 6.79 | 6.79 |
| Amount used*4 | 59 | 57 | 48 | 48 | 48 |
| Gloss | 94 | 91 | 94 | 84 | 93 |
| Average Particle Size before Storage | 107 | 107 | 107 | 108 | 102 |
| Increase rate of particle size (%) | 189 | 144 | 125 | 207 | 135 |
| Storage stability | ◯ | ◯ | ◯ | Δ | ◯ |

| | Examples | | | | |
|---|---|---|---|---|---|
| | 6 | 7 | 8 | 9 | 10 |
| Water-insoluble polymer | Polymer C | Polymer D | Polymer D | Polymer E | Polymer E |
| Mw of water-insoluble polymer ($\times 10^3$) | 220 | 90 | 90 | 150 | 150 |
| Crosslinking agent | | | | | |
| Kind | EX-810 | EX-810 | EX-810 | EX-810 | EX-810 |
| Amount used*1 | 3.9 | 3.9 | 5.5 | 1.9 | 3.9 |
| Number of molar equivalents of crosslinking agent (a)*2 | 76.1 | 31.4 | 43.4 | 25.3 | 52.3 |
| Number of moles of reactive groups (b)*3 | 369.3 | 167.9 | 167.9 | 279.8 | 279.8 |
| (a)/(b) | 0.21 | 0.19 | 0.26 | 0.09 | 0.19 |
| Weight-average segment molecular weight | 2850 | 2780 | 2030 | 5700 | 2810 |
| Mw of crosslinked polymer ($\times 10^4$) | 220 | 68 | 120 | 42 | 110 |
| Water-insoluble organic compound | | | | | |
| Kind | OBzP | Compound B | Compound B | DBS | DBS |
| Log P | 6.79 | 6.51 | 6.51 | 6.30 | 6.30 |
| Amount used*4 | 47 | 88 | 87 | 48 | 47 |
| Gloss | 84 | 98 | 102 | 103 | 96 |
| Average Particle Size before Storage | 102 | 100 | 96 | 97 | 102 |
| Increase rate of particle size (%) | 105 | 111 | 109 | 120 | 110 |
| Storage stability | ◯ | ◯ | ◯ | ◯ | ◯ |

| | Examples | | | |
|---|---|---|---|---|
| | 11 | 12 | 13 | 14 |
| Water-insoluble polymer | Polymer E | Polymer F | Polymer G | Polymer A |
| Mw of water-insoluble polymer ($\times 10^3$) | 150 | 230 | 400 | 36 |
| Crosslinking agent | | | | |
| Kind | EX-810 | EX-810 | EX-810 | EX-810 |
| Amount used*1 | 4.5 | 3.6 | 2.1 | 9.5 |
| Number of molar equivalents of crosslinking agent (a)*2 | 60.3 | 74.0 | 74.0 | 29.9 |
| Number of moles of reactive groups (b)*3 | 279.8 | 429.2 | 815.6 | 58.8 |
| (a)/(b) | 0.22 | 0.17 | 0.09 | 0.51 |

TABLE 3-continued

| | | | | |
|---|---|---|---|---|
| Weight-average segment molecular weight | 2450 | 3060 | 5330 | 1170 |
| Mw of crosslinked polymer ($\times 10^4$) | 150 | 192 | 111 | 160 |
| Water-insoluble organic compound | | | | |
| Kind | DBS | DBS | DBS | Compound A |
| Log P | 6.30 | 6.30 | 6.30 | 6.23 |
| Amount used*4 | 47 | 47 | 48 | 56 |
| Gloss | 95 | 85 | 95 | 78 |
| Average Particle Size before Storage | 102 | 100 | 100 | 107 |
| Increase rate of particle size (%) | 106 | 106 | 104 | 108 |
| Storage stability | ○ | ○ | ○ | ○ |

| | Comparative Examples | |
|---|---|---|
| | 1 | 2 |
| Water-insoluble polymer | Polymer B | Polymer E |
| Mw of water-insoluble polymer ($\times 10^3$) | 100 | 150 |
| Crosslinking agent | | |
| Kind | — | EX-810 |
| Amount used*1 | Unused | 3.9 |
| Number of molar equivalents of crosslinking agent (a)*2 | — | 52.3 |
| Number of moles of reactive groups (b)*3 | — | 279.8 |
| (a)/(b) | — | 0.19 |
| Weight-average segment molecular weight | — | 2810 |
| Mw of crosslinked polymer ($\times 10^4$) | — | 110 |
| Water-insoluble organic compound | | |
| Kind | OBzP | None |
| Log P | 6.79 | — |
| Amount used*4 | 48 | 0 |
| Gloss | 95 | 55 |
| Average Particle Size before Storage | 97 | 108 |
| Increase rate of particle size (%) | 270 | 111 |
| Storage stability | X | ○ |

Note:
*1 Amount (weight part) of crosslinking agent used on the basis of 100 parts by weight of water-insoluble polymer
*2 Number (a) of molar equivalents of crosslinking agent to be reacted with 1 mol of water-insoluble polymer
*3 Number (b) of moles of reactive groups capable of reacting with crosslinking agent which are contained in 1 mol of water-insoluble polymer
*4 Amount (weight part) of water-insoluble organic compound used on the basis of 100 parts by weight of water-insoluble crosslinked polymer (in Comparative Example 1, on the basis of 100 parts by weight of water-insoluble polymer)

From the results shown in Table 3, it was confirmed that the water-based inks obtained in Examples 1 to 14 were excellent in gloss and storage stability as well as a balance therebetween as compared to those obtained in Comparative Examples 1 to 2. Further, it was confirmed that printed images obtained by an ink-jet printing method using the water-based inks obtained in Examples 1 to 14 exhibited a practically sufficient optical density.

INDUSTRIAL APPLICABILITY

The water-based ink containing the water dispersion for ink-jet printing or the water-insoluble crosslinked polymer particles according to the present invention can exhibit an excellent storage stability, and can produce printed images or characters having an excellent gloss when printed on a coated paper.

The invention claimed is:
1. A water dispersion for ink jet printing, comprising particles of a water-insoluble crosslinked polymer which contain a colorant, and a water-insoluble organic compound,
wherein the water-insoluble crosslinked polymer is produced by crosslinking a water-insoluble polymer with a crosslinking agent; and the water-insoluble organic compound is represented by the following general formula (2):

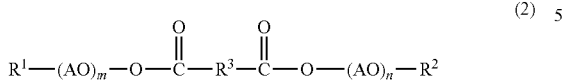

(2)

wherein $R^1$ and $R^2$ are each independently a hydrogen atom or a hydrocarbon group having 1 to 22 carbon atoms;

$R^3$ is a divalent hydrocarbon group having 1 to 18 carbon atoms;

in which $R^1$ and $R^2$ may be the same or different with the proviso that both of $R^1$ and $R^2$ are not hydrogen atoms at the same time, and $R^1$ to $R^3$ optionally having a substituent group selected from the group consisting of a halogen, alkoxy group having 1 to 12 carbon atoms, aryloxy group, oxycarbonyl group, acyl group, acyloxy group, cyano group, nitro group, hydroxyl, carboxyl group, oxo group, epoxy group, ether group and ester group;

m and n are each independently an average molar number of addition of AO of 0 to 30; and AO is an alkanediyloxy group.

2. The water dispersion for ink jet printing according to claim 1, wherein the water-insoluble organic compound is present in an amount of 5 to 300 parts by weight on the basis of 100 parts by weight of the water-insoluble crosslinked polymer forming the particles of the water-insoluble crosslinked polymer.

3. The water dispersion for ink jet printing according to claim 1, wherein the water-insoluble crosslinked polymer has a weight-average segment molecular weight of 1,400 to 20,000 as calculated from the following formula (I):

weight-average segment molecular weight=[(weight-average molecular weight of the water-insoluble polymer)/(number of molar equivalents of the crosslinking agent to be reacted with 1 mol of the water-insoluble polymer+1)] (1), with the proviso that when a ratio of [(number of molar equivalents of the crosslinking agent to be reacted with 1 mol of the water-insoluble polymer)/(number of moles of reactive groups capable of reacting with the crosslinking agent which are contained in the water-insoluble polymer)] is more than 1 (>1), the number of molar equivalents of the crosslinking agent to be reacted with 1 mol of the water-insoluble polymer is identical to the number of moles of reactive groups capable of reacting with the crosslinking agent which are contained in 1 mol of the water-insoluble polymer.

4. The water dispersion for ink jet printing according to claim 1, wherein the particles of the water-insoluble crosslinked polymer are produced by mixing particles of the water-insoluble polymer which contain the colorant with the crosslinking agent to crosslink the water-insoluble polymer with the crosslinking agent.

5. The water dispersion for ink-jet printing according to claim 1, wherein the water-insoluble crosslinked polymer has a weight-average molecular weight of 120,000 to 2,500,000.

6. The water dispersion for ink-jet printing according to claim 1, wherein the crosslinking agent is a compound having 2 or more epoxy groups in a molecule thereof.

7. The water dispersion for ink jet printing according to claim 1, wherein the number of the reactive groups contained in the crosslinking agent is from 2 to 4.

8. The water dispersion for ink jet printing according to claim 1, wherein the water-insoluble polymer is a water-insoluble vinyl polymer produced by copolymerizing a monomer mixture comprising (a) a salt-forming group-containing monomer, and (b) a macromer and/or (c) a hydrophobic monomer.

* * * * *